(12) United States Patent
Koshio et al.

(10) Patent No.: US 10,562,285 B2
(45) Date of Patent: Feb. 18, 2020

(54) MANUFACTURING APPARATUS AND MANUFACTURING METHOD OF OPTICAL DISPLAY UNIT

(71) Applicant: NITTO DENKO CORPORATION, Ibaraki-shi, Osaka (JP)

(72) Inventors: Satoru Koshio, Ibaraki (JP); Minoru Maeda, Ibaraki (JP); Tomokazu Yura, Ibaraki (JP); Kazuo Kitada, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 16/341,397

(22) PCT Filed: Oct. 4, 2017

(86) PCT No.: PCT/JP2017/036136
§ 371 (c)(1),
(2) Date: Apr. 11, 2019

(87) PCT Pub. No.: WO2018/074235
PCT Pub. Date: Apr. 26, 2018

(65) Prior Publication Data
US 2019/0232629 A1    Aug. 1, 2019

(30) Foreign Application Priority Data

Oct. 18, 2016  (JP) .................................. 2016-204522
Oct. 19, 2016  (JP) .................................. 2016-205082

(51) Int. Cl.
*B32B 37/02*      (2006.01)
*B32B 37/00*      (2006.01)
(Continued)

(52) U.S. Cl.
CPC .......... *B32B 37/02* (2013.01); *B29D 11/0073* (2013.01); *B32B 37/0046* (2013.01);
(Continued)

(58) Field of Classification Search
CPC ... B32B 37/02; B32B 38/1858; B32B 43/006; B32B 37/203; B32B 37/0046; B32B 2457/20; G02F 1/1303
See application file for complete search history.

(56) References Cited

U.S. PATENT DOCUMENTS

2005/0016670 A1    1/2005    Kanbara et al.
2015/0190995 A1    7/2015    Kim et al.
(Continued)

FOREIGN PATENT DOCUMENTS

JP    2005-43384 A    2/2005
JP    4346971 B2      10/2009
(Continued)

OTHER PUBLICATIONS

Machine translation of JP-2014157344-A published Aug. 2014 (EPO and Google).*
(Continued)

*Primary Examiner* — Michael N Orlando
*Assistant Examiner* — Cynthia L Schaller
(74) *Attorney, Agent, or Firm* — Hauptman Ham, LLP

(57) ABSTRACT

The present invention provides a manufacturing apparatus and manufacturing method for realizing lamination with high accuracy responding to increase in speed and growth in size in an optical display unit manufacturing apparatus. The present invention is a manufacturing apparatus and manufacturing method in which, in the optical display unit manufacturing apparatus, a holding device which reciprocates between a peeling position and an upstream side predetermined position of the peeling position is deployed,
(Continued)

the holding device holds the optical film laminate in a width-wise direction including both sides, and moves for a fixed distance, and at the peeling position, sends a front end of the optical film sheet peeled with the adhesive layer from the carrier film to a downstream side predetermined position of the peeling position to release the optical film laminate when the holding device reaches the lower side predetermined position.

18 Claims, 16 Drawing Sheets

(51) Int. Cl.
　　B32B 37/20　　(2006.01)
　　B32B 43/00　　(2006.01)
　　B32B 38/18　　(2006.01)
　　B65G 49/06　　(2006.01)
　　B29D 11/00　　(2006.01)
　　G02F 1/13　　(2006.01)
(52) U.S. Cl.
　　CPC ........ *B32B 37/203* (2013.01); *B32B 38/1858* (2013.01); *B32B 43/006* (2013.01); *B65G 49/06* (2013.01); *B32B 2457/20* (2013.01); *G02F 1/1303* (2013.01); *G02F 2202/28* (2013.01)

(56) References Cited

U.S. PATENT DOCUMENTS

2015/0328870 A1　　11/2015　Yura et al.
2018/0009211 A1*　1/2018　Lee .......................... B32B 7/06

FOREIGN PATENT DOCUMENTS

| JP | 4377964 B1 | 12/2009 |
| JP | 2011-257463 A | 12/2011 |
| JP | 2014-115615 A | 6/2014 |
| JP | 2014157344 A * | 8/2014 |
| JP | 2015-045820 A | 3/2015 |
| KR | 10-2015-0011575 A | 2/2015 |
| KR | 10-1540431 B1 | 7/2015 |
| WO | WO2009075030 * | 6/2009 |
| WO | 2011/155036 A1 | 12/2011 |
| WO | 2013/163827 A1 | 11/2013 |

OTHER PUBLICATIONS

Google Key Word Search (performed Jun. 17, 2019).*
Machine Translation of WO2009075030 (Google/EPO).*
International Search Report for corresponding international application PCT/JP2017/036136 dated Dec. 26, 2017.
The International Preliminary Report on Patentability for corresponding international application PCT/JP2017/036136 dated May 2, 2019.

* cited by examiner

MANUFACTURING APPARATUS AND MANUFACTURING METHOD OF OPTICAL DISPLAY UNIT

CROSS REFERENCE TO RELATED APPLICATION

This application claims the priority of Japanese Patent Application No. 2016-204522, filed on Oct. 18, 2016, and Japanese Patent Application No. 2016-205082, filed on Oct. 19, 2016, in the JPO (Japanese Patent Office). Further, this application is the National Phase Application of International Application No. PCT/JP2017/036136, filed on Oct. 4, 2017, which designates the United States and was published in Japan. Both of the priority documents are hereby incorporated by reference in their entireties.

TECHNICAL FIELD

The present invention relates to a manufacturing apparatus and manufacturing method for continuously manufacturing an optical display unit. More specifically, the present invention relates to a manufacturing apparatus and manufacturing method of an optical display unit in which variation in laminating positions of an optical film sheet to be laminated with a rectangular panel member is controlled to improve lamination accuracy thereof.

BACKGROUND ART

As described in Patent Literature 1 or 4, in recent years, in a manufacturing site of optical display units, Roll-to-Panel (RTP) manufacturing apparatus and manufacturing method are employed.

In the RTP method, generally, an optical display device is continuously manufactured as follows. First, a web of optical film laminate is fed from a roll. The optical film laminate is configured as including a web of carrier film, an adhesive layer laminated to one of opposite surfaces of the carrier film, and a web of optical film laminated on the carrier film via the adhesive layer.

The optical film may be a single-layered or multi-layered film. On the web of optical film laminate fed from the roll, slit lines in a width-wise direction are continuously formed to thereby form a sheet of optical film including the adhesive layer, a so-called optical film sheet, between adjacent slit lines.

The optical film sheet continuously supported on the web of carrier film is peeled with the adhesive layer from the carrier film by a peeling means arranged against or near a laminating position, and sent to the laminating position. Each of the optical film sheets which has reached to the laminating position is laminated with one of opposite surfaces of a panel member separately conveyed to the laminating position by a laminating means provided at the laminating position.

In a case of a liquid crystal display, a panel member having an optical film sheet laminated on one of opposite surfaces is laminated with another optical film sheet on the other of the opposite surfaces. When performing lamination on the other of the opposite surfaces, the another optical film sheet peeled with an adhesive layer from another web of carrier film by another peeling means is sent to a laminating position same as or different from the position where the first optical film sheet and the panel member were laminated, and laminated with the other of the opposite surfaces of the panel member.

With the spread of such RTP method, regardless of increase in speed in continuous manufacturing and growth in size of the optical display unit, required in the manufacturing apparatus and manufacturing method of the optical display unit, the lamination accuracy of 1 mm or less is required in reality for that a narrow width bezel is in demand.

Essentially, in the RTP method, it is not easy to position the flexible optical film sheet including the adhesive layer to be peeled from the web of carrier film to the rectangular panel member conveyed to the laminating position, with accuracy. Nevertheless, now, solutions for three problems; increase in speed, growth in size, and high accuracy, are required in the RTP manufacturing apparatus or manufacturing method.

A specific technical problem to be solved is that, in sequentially peeling the optical film sheet continuously laminated to the web of carrier film of the web of optical film laminate, having slit lines crossing a longitudinal direction, from the carrier film, and laminating with the corresponding rectangular panel member to continuously manufacture the optical display unit, deviation in a transverse direction and/or flopping of the optical film are caused due to loosening and/or difference in tension on both sides of the optical film laminate, which occur at the time of conveying the optical film laminate. Also, another problem to be solved is that how variation in lamination accuracy of the panel member and the optical film sheet, which occurs due to the deviation in the transverse direction and/or the flopping of the optical film laminate, can be controlled. More specifically, the problem to be solved is to realize the RTP manufacturing apparatus or manufacturing method which allows for controlling such variation.

Conventionally, as described in Patent Literature 4 or 5, a posture of a panel member has been adjusted so that it is aligned with a deviated position of an optical film sheet which deviation is caused due to deviation in a transverse direction and/or flopping of an optical film laminate which occur at the time of conveying the optical film laminate. However, along with the narrow width bezels in recent years, it is becoming difficult with the above adjustment to meet the demand of laminating the optical film sheet with the panel member with high accuracy, responding to increase in speed and growth in size.

More specifically, Patent Literature 4 describes as that, as shown in FIG. 6 thereof, a center line of the sent optical film sheet is aligned to a center line of the panel member for lamination. However, the inventors considered the deviation of the optical film sheet due to deviation in the transverse direction and/or flopping caused by loosening in tension on both sides of the optical film laminate which occur at the time of conveying the optical film laminate, as a new technical problem to be solved for realizing the lamination with high accuracy responding to the increase in speed and growth in size, not considering the above as predetermined conditions, and actively challenged such problem to arrive at a solution.

For solving such problem, first, it is necessary to use a peeling means by which the optical film sheet is certainly peeled with the adhesive layer from the carrier film of the conveyed optical film laminate without causing any deviation in the transverse direction and/or flopping. The peeling means in the RTP method generally employs a structure having a wedge-shaped cross section or a knife-shaped structure shown in FIG. 10 of Patent Literature 1 or FIG. 5 of Patent Literature 4. Of course, a rotating drum having a suctioning fixing part shown by a suction drum of FIG. 8 of Patent Literature 2 and/or a laminate drum of FIG. 9 of Patent Literature 3 can be used as the peeling means in addition to the above.

CITATION LIST

Patent Literature 1: Japanese Patent Number 4377964
Patent Literature 2: Japanese Patent Number 4346971
Patent Literature 3: Korean Patent Registration Number 10-1540431
Patent Literature 4: WO2011/155036 A1
Patent Literature 5: Korean Patent Publication Number: 10-2015-11575

SUMMARY OF INVENTION

Technical Problem

The problem to be solved by the present invention is to realize lamination with high accuracy responding to increase in speed and growth in size by, in a manufacturing apparatus for continuously manufacturing an optical display unit, conveying a web of optical film laminate including a carrier film, an adhesive layer formed on one of opposite surfaces of the carrier film, and a plurality of optical film sheets continuously supported on the carrier film via the adhesive layer, and at a peeling position, sequentially peeling the optical film sheet with the adhesive layer from the carrier film, and at a laminating position, laminating the optical film sheet with a panel member.

Solution to Problem

The present invention relates to the RTP manufacturing apparatus and manufacturing method for challenging such problems. More particularly, the present invention allows for solving the problem by the followings where,
in the manufacturing apparatus for continuously manufacturing an optical display unit in which, at a peeling position, the optical film sheet is sequentially peeled with the adhesive layer from the carrier film, and at a laminating position, the optical film sheet is laminated with a panel member, wherein a reciprocating holding device is deployed between a peeling position of the manufacturing apparatus and an upstream side predetermined position of the peeling position, wherein at the upstream side predetermined position, the holding device holds the optical film laminate in a width-wise direction including both sides, and moves the optical film laminate being held by the holding device for a fixed distance, and at the peeling position, sends a front end of the optical film sheet peeled with the adhesive layer from the carrier film to a downstream side predetermined position of the peeling position, and releases the optical film laminate being held thereat.

The present invention provides, in one aspect, a RTP manufacturing apparatus 10 for continuously manufacturing an optical display unit. The present manufacturing apparatus 10 is the manufacturing apparatus 10 for continuously manufacturing an optical display unit 6, as shown in FIG. 1, by conveying a web of optical film laminate 1 fed from R1, including a carrier film 2, an adhesive layer 4 formed on one of opposite surfaces of the carrier film 2, and a plurality of optical film sheets 3 continuously supported on the carrier film 2 via the adhesive layer 4, and at a peeling position 100, sequentially peeling the optical film sheet 3 with the adhesive layer 4 from the carrier film 2 to be wound to R2, and at a laminating position 200, laminating the peeled optical film sheet 3 with a panel member 5.

In the present manufacturing apparatus 10, a reciprocating holding device 50 is further deployed between the peeling position 100 and an upstream side predetermined position 300 of the peeling position 100. The holding device 50 is shown enlarged in FIGS. 2 to 4 respectively. At the upstream side predetermined position 300 of FIG. 2 or FIG. 3, it holds the optical film laminate 1 in a width-wise direction including both sides, and moves the optical film laminate 1 being held for a fixed distance (FIG. 4). Then, at the peeling position 100 of FIG. 2 or 3, when a front end 31 of the optical film sheet 3 peeled with the adhesive layer 4 from the carrier film 2 to be wound to the R2 reaches a downstream side predetermined position 400 of the peeling position 100, it releases the optical film laminate 1.

The holding device 50 includes a holding means 51. The holding means 51 can move in synchronization with the conveyance of the optical film laminate 1. For the holding means 51, for example, a pair of catching means 511, a sucking cup or sucking means 512 for suctioning one of both sides 11 of the optical film laminate 1, or a pair of cylindrical sandwiching rollers 513 for sandwiching both sides 11 of the optical film laminate 1, shown in FIG. 5, may be used as long as it is a means for sandwiching both sides 11 from right and left sides with respect to a sending direction of the optical film laminate 1.

In the present manufacturing apparatus 10, a peeling means 110 is deployed at the peeling position 100, wherein the peeling means is for winding the carrier film 2 of the optical film laminate 1 being conveyed to thereby expose the adhesive layer 4 and peel the optical film sheet 3 with the adhesive layer 4 from the carrier film 2. For the peeling means 110 deployed at the peeling position 100, a structure having wedge-shaped cross section 60 having a tip 61 shown in FIG. 2 may be used.

This peeling means 110 has a peeling action of, while conveying the optical film laminate 1, at the peeling position 100, bending a back side 20 of the carrier film 2 at the tip end 61 to wind thereof to thereby peel the optical film sheet 3 with the adhesive layer 4 from the carrier film 2, and sending the front end 31 of the optical film sheet 3 to the downstream side predetermined position 400.

When this peeling means 110 is used, the downstream side predetermined position 400 is desirably located downstream of the laminating position 200. When the downstream side predetermined position 400 is downstream of the laminating position 200, at the laminating position 200, first, the front end 31 of the peeled optical film sheet 3 is laminated and fixed to the panel member 5. Then, after the front end 31 of the optical film sheet 3 reaches the downstream side predetermined position 400 located further downstream, the holding means 51 may release the both sides 11 of the optical film laminate 1, and thus, the deviation in the transverse direction and/or the flopping of the optical film sheet 3 can be suppressed more certainly.

In the present manufacturing apparatus 10, a peeling means 110 different from the peeling structure of FIG. 2 may also be deployed at the peeling position 100. It is shown in FIG. 3. The peeling means 110 is a rotating drum 70 having a suctioning fixing part 71, and the rotating drum 70 cooperatively operates with the laminating means 210 as will be described in the followings.

The peeling means 110 has a peeling action of, while conveying the optical film laminate 1, at the peeling position 100, suctioning and fixing a back side 30 of the front end 31 of the optical film sheet 3 to the suctioning fixing part 71 of the rotating drum 70, then winding the carrier film 2 while starting operation of the rotating drum 70 to thereby peel the optical film sheet 3 with the adhesive layer 4 from the carrier film 2 to suction and convey the peeled optical film sheet 3.

Next, when the front end 31 of the optical film sheet 3 suctioned and fixed to the rotating drum 70 is suctioned and conveyed to the downstream side predetermined position 400 located upstream of the laminating position 200, the holding means 51 may release the both sides 11 of the optical film laminate 1 thereat. The optical film sheet 3 is suctioned and conveyed to the laminating position 200 by the rotating drum 70 while being suctioned and fixed, and thus, the deviation in the transverse direction and/or the flopping of the optical film sheet 3 is suppressed more certainly.

For the optical film laminate 1 of the present manufacturing apparatus 10, as shown in FIG. 1, it is preferable to use either of an optical film laminate made by placing the optical film sheet 3 including the adhesive layer 4 shaped at least rectangularly to be adhered on the carrier film 2, or an optical film laminate made by forming slit lines 12 in a width-wise direction at fixed longitudinal intervals in an optical film 3' in which the carrier film 2 is laminated via an adhesive layer 4' using a slitting device shown by R3 of the present manufacturing apparatus 10 to form an optical film sheet 3 including the adhesive layer 4.

The holding position 501 of the holding device 50 with respect to the optical film laminate 1 is preferably a position near a rear end 32 of the optical film sheet 3 as shown in FIG. 4.

The holding device 50 is inter-related with the conveyance of the optical film laminate 1 to correct loosening of tension at both sides of the optical film laminate 1 or difference in tension due to the loosening to thereby allow for suppressing deviation in the transverse direction and/or flopping of the optical film sheet 3 including the adhesive layer 4 peeled from the carrier film 2 and sent to the downstream side predetermined position 400.

The present invention provides, in another aspect, a RTP manufacturing method for continuously manufacturing the optical display unit 6.

With the present manufacturing method, as shown in FIG. 1, in the manufacturing apparatus 10 of the optical display unit 6, a web of optical film laminate 1 fed from R1, including the carrier film 2, the adhesive layer 4 formed on one of opposite surfaces of the carrier film 2, and a plurality of optical film sheets 3 continuously supported on the carrier film 2 via the adhesive layer 4 is conveyed, and at the peeling position 100, the optical film sheet 3 is sequentially peeled with the adhesive layer 4 from the carrier film 2. Further, in the present manufacturing method, the optical display unit 6 is continuously manufactured by laminating the peeled optical film sheet 3 with the panel member 5 at the laminating position 200.

In the manufacturing apparatus 10 used in the present manufacturing method, the holding device 50 which reciprocates between the peeling position 100 and the upstream side predetermined position 300 of the peeling position 100 is deployed.

The present manufacturing method includes:

a holding process A in which, when the optical film laminate 1 is conveyed and the rear end 32 of the optical film sheet 3 reaches the upstream side predetermined position 300 of the peeling position 100, the holding device 50 at an initial position 500 holds both sides 11 in a width-wise direction of the optical film laminate 1 being conveyed, an outwardly moving process B in which the holding device 50 moves the optical film laminate 1 for a fixed distance L during holding the both sides 11 of the optical film laminate 1, a peeling process C in which the peeling means 110 peels the optical film sheet 3 with the adhesive layer 4 from the carrier film 2 of the optical film laminate 1 at the peeling position 100, a releasing process D in which, when a front end 31 of the optical film sheet 3 reaches the downstream side predetermined position 400 of the peeling position 100, the holding device 50 releases the optical film laminate 1, a backwardly moving process E in which the holding device 50 returns to the initial position 300, and a laminating process F in which the laminating means 210 laminates the peeled optical film sheet 3 with the panel member 5 by the adhesive layer 4 at the laminating position 200.

In the holding process A of the present manufacturing method, the holding position 501 where the holding means 51 of the holding device 50 holds the optical film laminate 1 is preferably located near the rear end 32 of the optical film sheet 3.

The outwardly moving process B of the present manufacturing method is preferably synchronized with the conveyance of the optical film laminate 1, and more preferably synchronized with laminating operation including winding of the carrier film.

The outwardly moving process B of the present manufacturing method may further correct loosening of tension at both sides of the optical film laminate 1 or difference in tension due to the loosening by being inter-related with the conveyance of the optical film laminate 1 to thereby suppress deviation in the transverse direction and/or flopping of the optical film sheet 3 including the adhesive layer 4 to be sent to the downstream side predetermined position 400.

For the peeling means 110 deployed at the peeling position 100 of the manufacturing apparatus 10 used in the present manufacturing method, either of the structure having wedge-shaped cross section 60 having the tip end 61, or the rotating drum 70 having the suctioning fixing part 71 may be used.

In the peeling process C of the present manufacturing method, when the structure having wedge-shaped cross section 60 having the tip end 61 is deployed as the peeling means 110 at the peeling position 100, a back side 20 of the carrier film 2 may be bent at the tip end 61 of the structure having wedge-shaped cross section 60 to thereby wind the carrier film 2 while the optical film laminate 1 is conveyed.

Further, when the structure having wedge-shaped cross section 60 is deployed as the peeling means 110, the downstream side predetermined position 400 is desirably downstream of the laminating position 200. It is because, when the downstream side predetermined position 400 is downstream of the laminating position 200, the front end of the optical film sheet 3 is fixed to the panel member 5 at the laminating position 200, and the optical film laminate 1 may be released after the front end of the optical film sheet 3 reaches the downstream side predetermined position 400 located further downstream. The deviation in a transverse direction and/or flopping of the optical film sheet 3 may be suppressed more certainly thereby.

On the other hand, in the peeling process C of the present manufacturing method, when the rotating drum 70 having the suctioning fixing part 71 is deployed as the peeling means 110 at the peeling position 100, with the optical film laminate 1 being conveyed, the back side 30 of the front end 31 of the optical film sheet 3 is suctioned and fixed to the suctioning fixing part 71 of the rotating drum 70 at the peeling position 100, and the carrier film 2 is wound with the rotating drum 70 being activated. The optical film sheet 3 with the adhesive layer 4 is thereby peeled from the carrier film 2, and suctioned and conveyed toward the laminating position 200 by the rotating drum 70.

When the front end 31 of the optical film sheet 3 suctioned and fixed to the rotating drum 70 is suctioned and conveyed to the downstream side predetermined position 400 located upstream of the laminating position 200, the holding means 51 may release the both sides 11 of the optical film laminate 1. On the other hand, the optical film sheet 3 is suctioned and conveyed by the rotating drum 70 to the laminating position 200 being suctioned and fixed, and thus, the deviation in the transverse direction and/or flopping of the optical film sheet 3 may be suppressed more certainly thereby.

The optical film laminate 1 used in the present manufacturing method may be either of, as shown in FIG. 1, an optical film laminate made by placing the optical film sheet 3 including the adhesive layer 4 shaped at least rectangularly to be adhered on the carrier film 2, or an optical film laminate made by forming slit lines in a width-wise direction at fixed longitudinal intervals in an optical film 3' in which the carrier film 2 is laminated via an adhesive layer 4' using a slitting device shown by R3 of the present manufacturing apparatus 10 to form an optical film sheet 3 including the adhesive layer 4.

DESCRIPTION OF EMBODIMENTS

Figure 1:
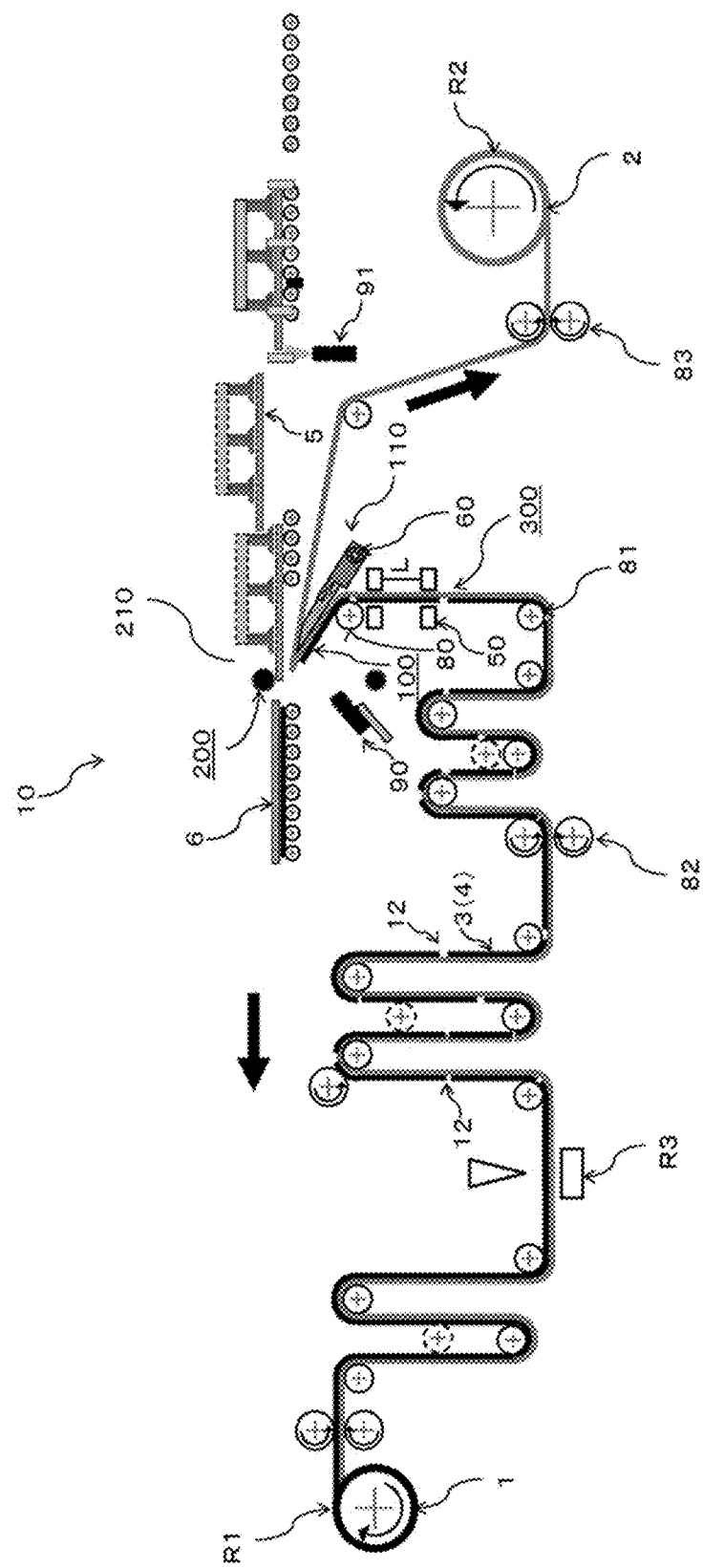
FIG. 1 is a schematic diagram illustrating a manufacturing apparatus of the present invention.

In the followings, a manufacturing apparatus and manufacturing method for continuously manufacturing an optical display unit according to the present invention are described with references to drawings. FIG. 1 is a schematic diagram illustrating the manufacturing apparatus or manufacturing method for continuously manufacturing an optical display unit, in which at a peeling position 100 of a RTP manufacturing apparatus 10, an optical film sheet 3 is sequentially peeled with an adhesive layer 4 by a peeling means 110 from a carrier film 2 included in a web of optical film laminate 1 fed from R1 by driving means 82 and 83, and at a laminating position 200, a laminating means 210 laminates the optical film sheet 3 with a panel member 5 via the adhesive layer 4 to thereby manufacture the optical display unit 6. However, the apparatus shown here uses a structure having wedge-shaped cross section 60 having a tip end 61 as the peeling means 110.

Figure 2:
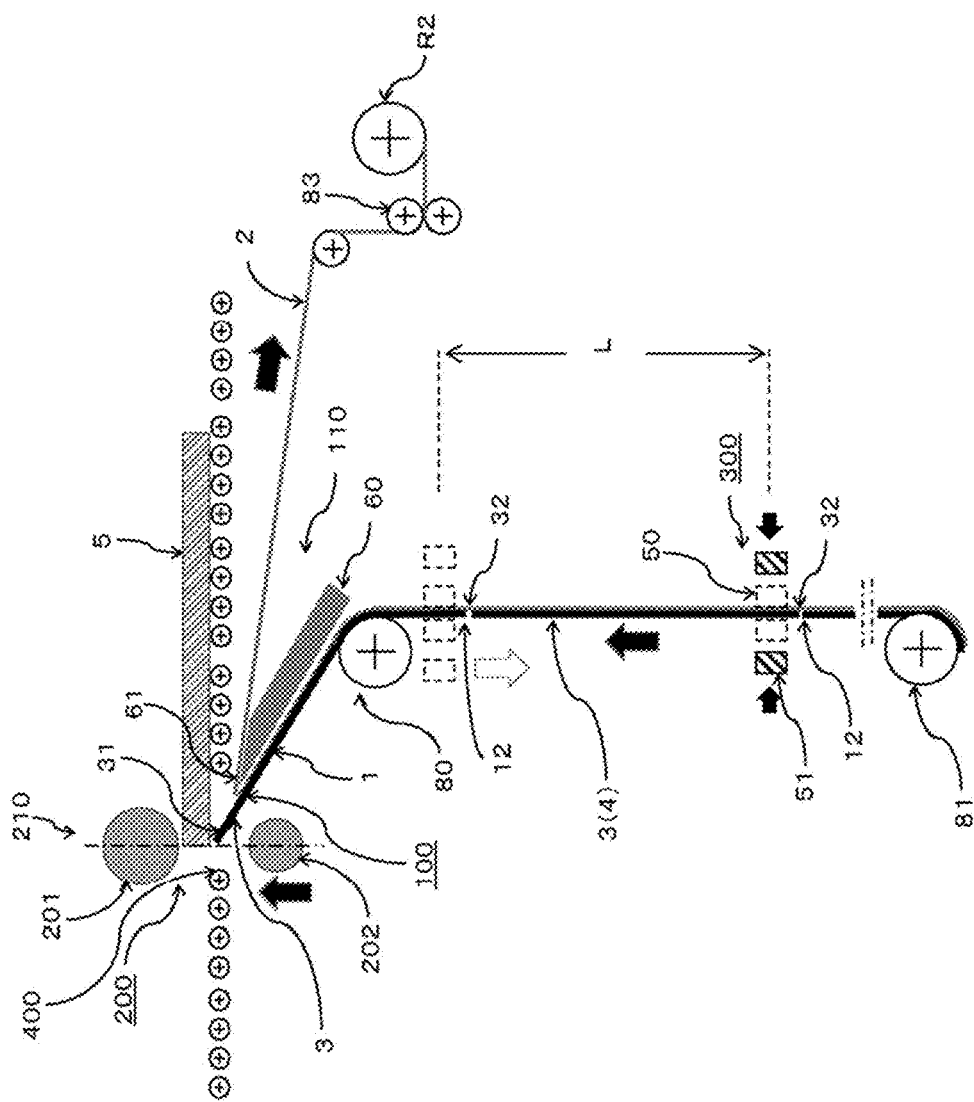
FIG. 2 is an enlarged schematic diagram of a reciprocating holding device with a structure having wedge-shaped cross section having a tip end at a peeling position of the manufacturing apparatus of the present invention.

FIG. 2 is an embodiment in which the structure having wedge-shaped cross section 60 having the tip end 61 is deployed as the peeling means 110 at the peeling position 100 of the manufacturing apparatus 10 shown in FIG. 1. When this manufacturing apparatus 10 is used, at the peeling position 100, a back side 20 of the carrier film 2 is bent at the tip end 61 of the structure having wedge-shaped cross section 60 by winding operation (FIG. 1) of R2 by the driving means 83 to wind the carrier film 2 to thereby peel the optical film sheet 3 with the adhesive layer 4 from the carrier film 2. The peeled optical film sheet 3 is sent to a laminating position 200 to be laminated with the panel member 5 via the adhesive layer 4 by the laminating means 210.

Figure 8:
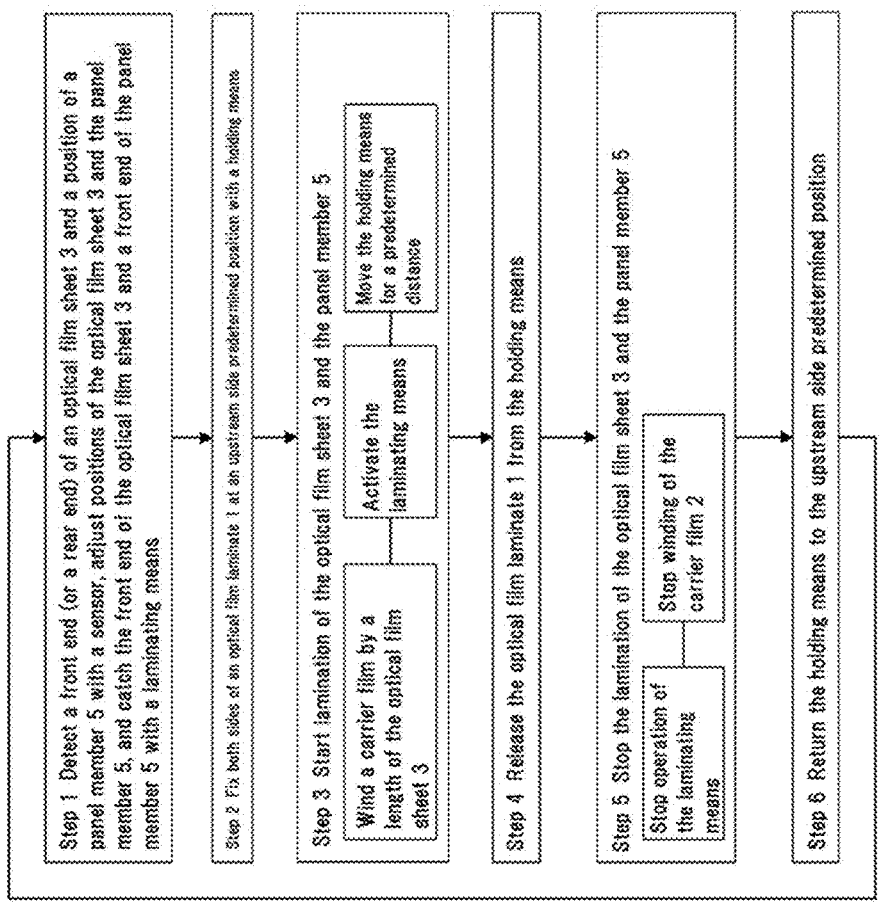
FIG. 8 illustrates a first operational flow in the manufacturing apparatus of the present invention having the reciprocating holding device with the structure having wedge-shaped cross section having the tip end.
Figure 9:
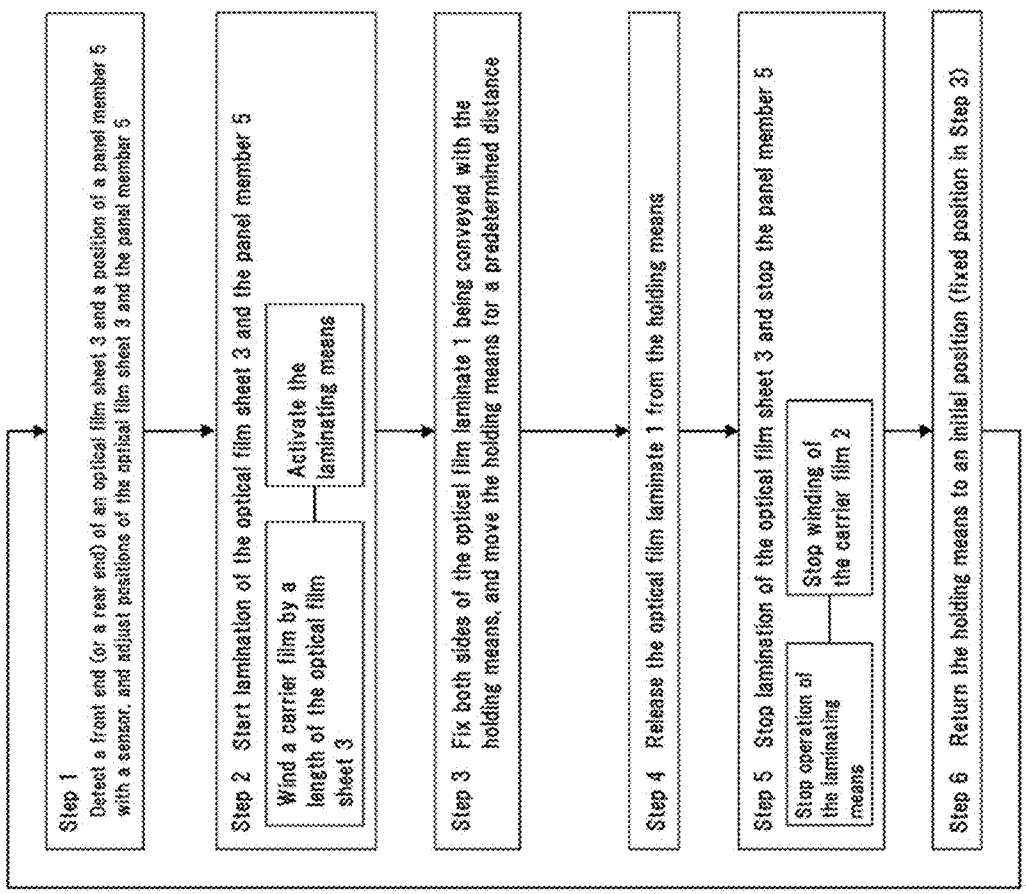
FIG. 9 illustrates a second operational flow in the manufacturing apparatus of the present invention having the reciprocating holding device with the structure having wedge-shaped cross section having the tip end.

An operational flow by the manufacturing apparatus 10, in which the structure having wedge-shaped cross section 60 having the tip end 61 is used as the peeling means 110, and the optical film sheet 3 is laminated with the panel member 5 at the laminating position 200, is shown in FIGS. 8 and 9 and details are described in the followings.

Figure 3:
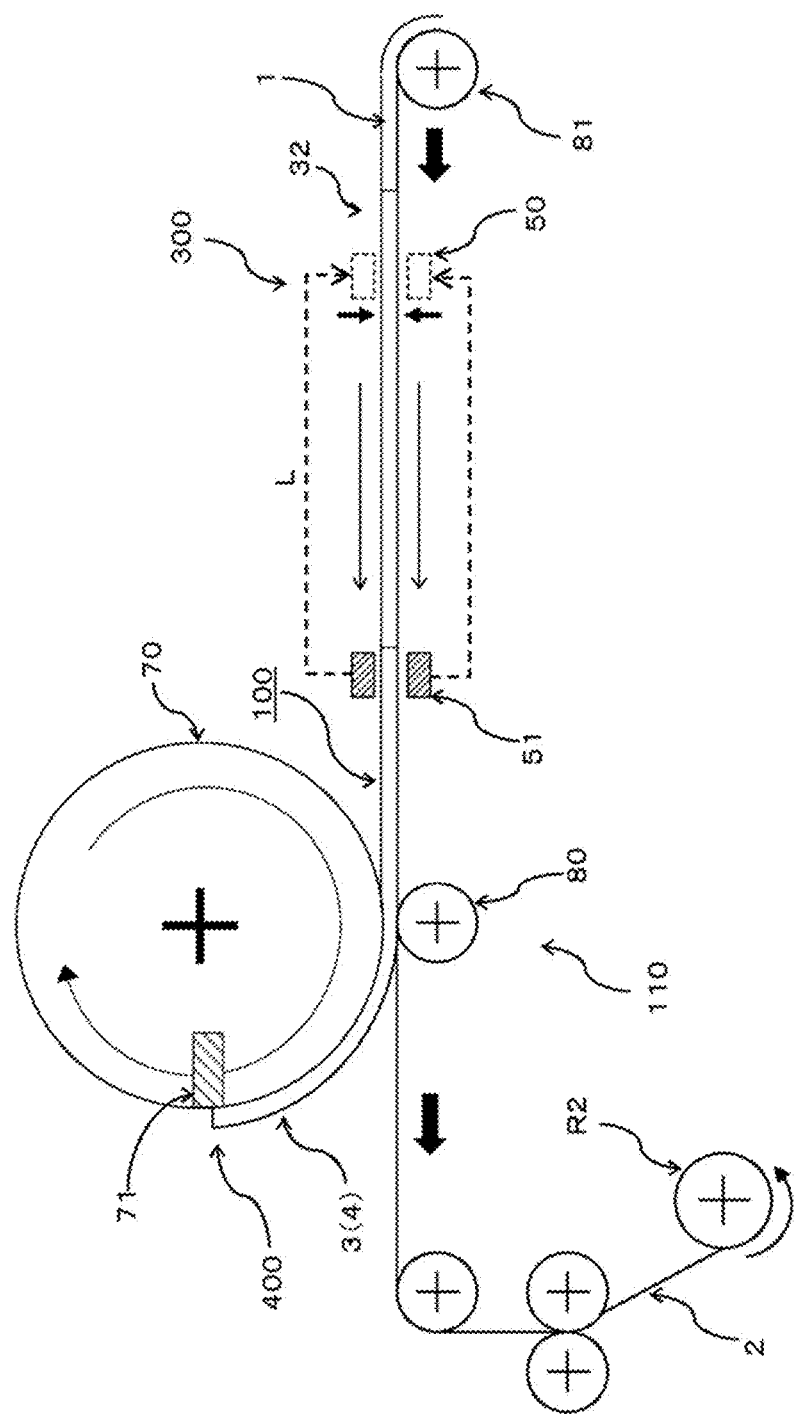
FIG. 3 is an enlarged schematic diagram of a reciprocating holding device with a rotating drum having a suctioning fixing part at a peeling position of the manufacturing apparatus of the present invention.

FIG. 3 is another embodiment in which a rotating drum 70 having a suctioning fixing part 71 is deployed as the peeling means 110 at the peeling position 100 of the manufacturing apparatus 10 shown in FIG. 1. When this manufacturing apparatus 10 is used, at the peeling position 100, the suctioning fixing part 71 of the rotating drum 70 suctions and fixes a back side 30 of a front end 31 of the optical film sheet 3, the rotating drum 70 is activated to be moved in an inter-related manner by the winding operation (FIG. 1) of the carrier film 2 of R2 by the driving means 83 to thereby peel the optical film sheet 3 with the adhesive layer 4 from the carrier film 2, and the peeled optical film sheet 3 is sent to the laminating position 200. At the laminating position 200, the rotating drum 70 cooperates with the laminating means 210, and the optical film sheet 3 is laminated with the panel member 5 via the adhesive layer 4.

Figure 11:
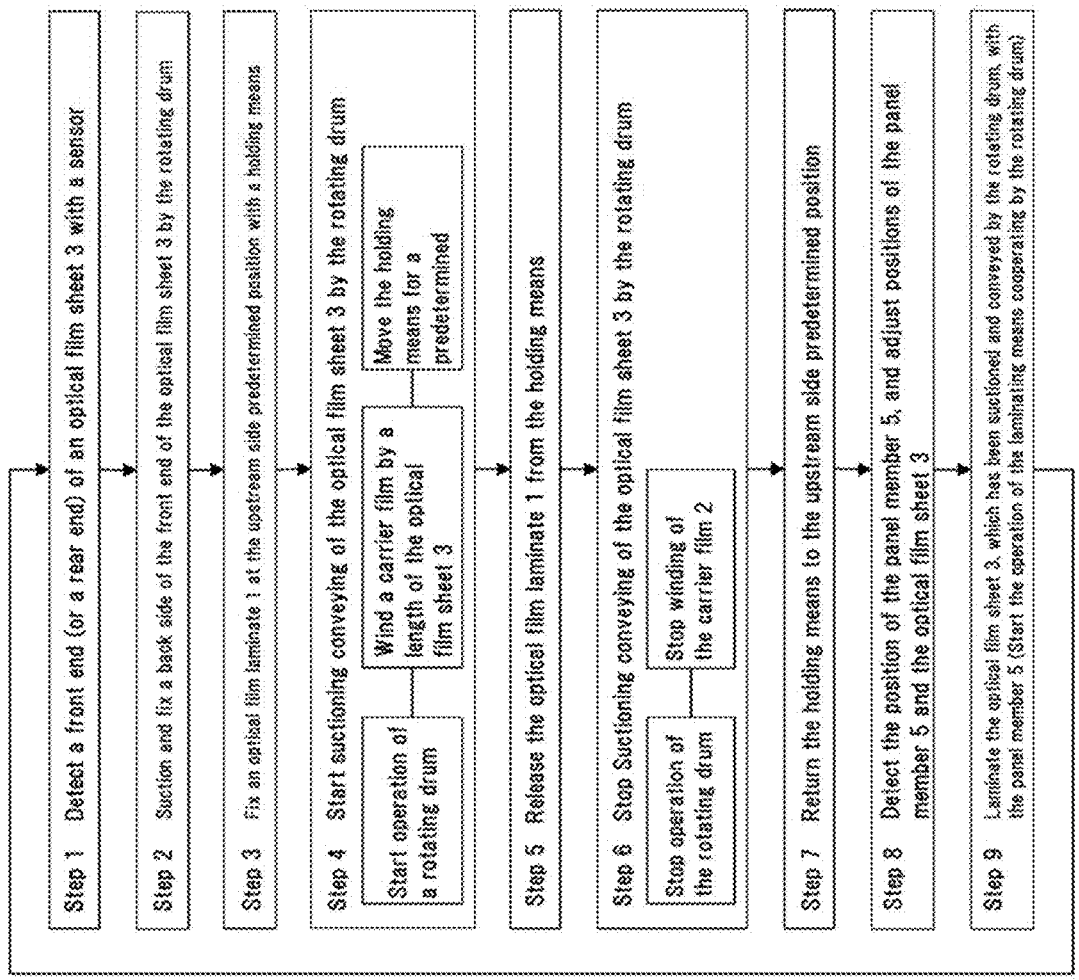
FIG. 11 illustrates a first operational flow in the manufacturing apparatus of the present invention having the reciprocating holding device with a rotating drum having a suctioning fixing part.
Figure 12:
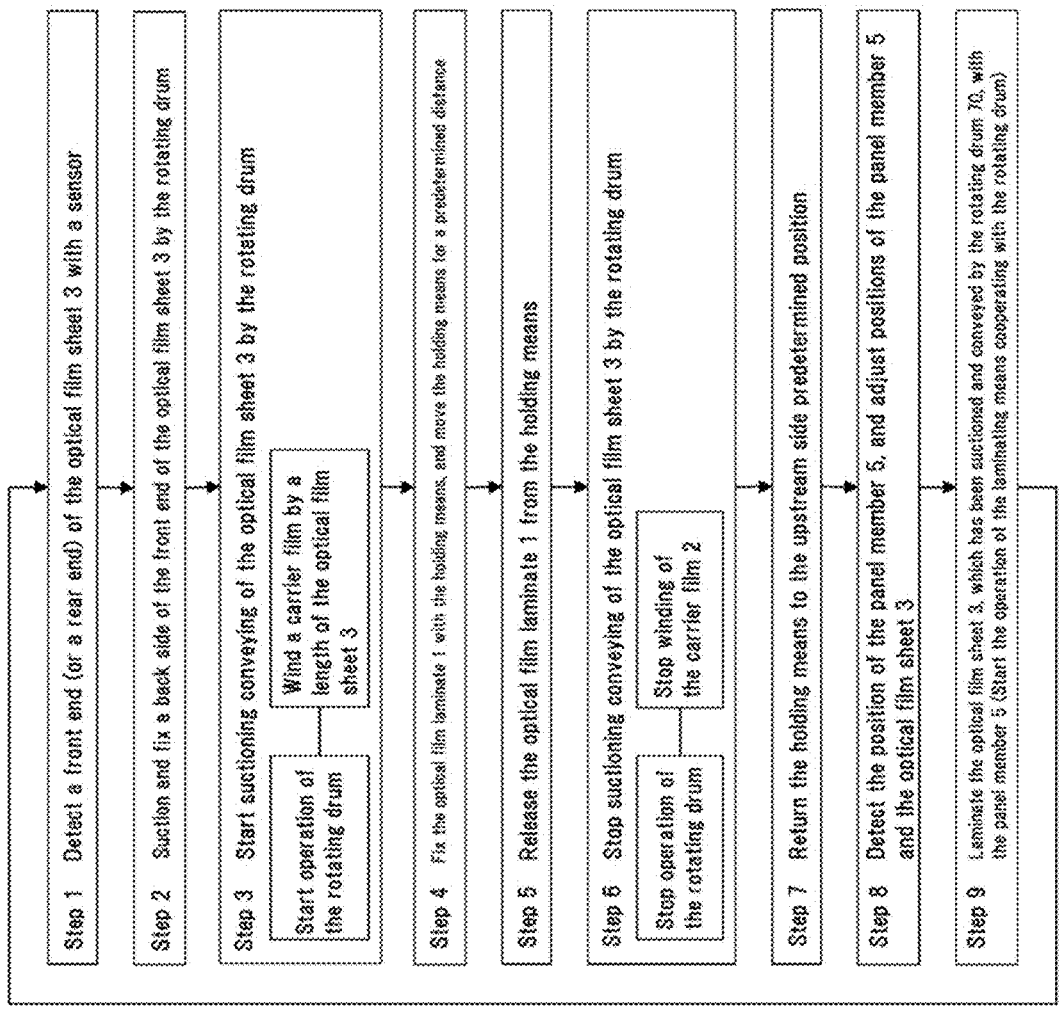
FIG. 12 illustrates a second operational flow in the manufacturing apparatus of the present invention having the reciprocating holding device with the rotating drum having the suctioning fixing part.

An operational flow by the manufacturing apparatus 10, in which the rotating drum 70 having the suctioning fixing part 71 is used as the peeling means 110, and the optical film sheet 3 is laminated with the panel member 5 at the laminating position 200, is shown in FIGS. 11 and 12, and details are described in the followings.

In the manufacturing apparatus 10 shown in FIG. 2 or FIG. 3, further, an upstream side predetermined position 300 is defined between a guide roller 80 located just before or at the peeling position 100 and an upstream side guide roller 81, and a holding device 50 which reciprocates between the upstream side predetermined position 300 and the guide roller 80 is deployed.

A distance L which the holding device 50 deployed in the manufacturing apparatus 10 reciprocates is preferably a distance equal to a length $L_0$ in a sending direction of the optical film sheet 3 or a distance shorter than such length $L_0$. It is because, at the laminating position 200 of the manufacturing apparatus 10, a distance which the optical film laminate 1 is conveyed by one laminating operation is generally equal to the length $L_0$ in the sending direction of the optical film sheet 3, and it will not be longer than the length $L_0$. Therefore, the length L which the holding device 50 moves while holding both sides 11 of the optical film laminate 1 will be the length $L_0$ in the sending direction of the optical film sheet 3 or shorter than the length $L_0$.

FIG. 8 is a first operational flow in the manufacturing apparatus 10 having the reciprocating holding device 50 with the structure having wedge-shaped cross section 60 having the tip end 61. It is also Steps of the first operational flow by the manufacturing apparatus 10 in which moving distance L of the holding device 50 becomes the length $L_0$ in the sending direction of the optical film sheet 3. Steps 1 to 6 are described in detail in the followings.

Step 1 includes a step of detecting the front end 31 (or the rear end 32) of the optical film sheet 3 by a sensor 90 (FIG. 1), and detecting a position of the panel member 5 by another sensor 91 (FIG. 1) at the same time. Step 1 is also a step of conveying the panel member 5 to the laminating position 200 so as to be aligned with the position of the optical film sheet 3, adjusting the position of the optical film sheet 3 and the position of the panel member 5, and catching the front end 31 of the optical film sheet 3 and the front end 55 of the panel member 5 by the laminating means 210.

Figure 4:
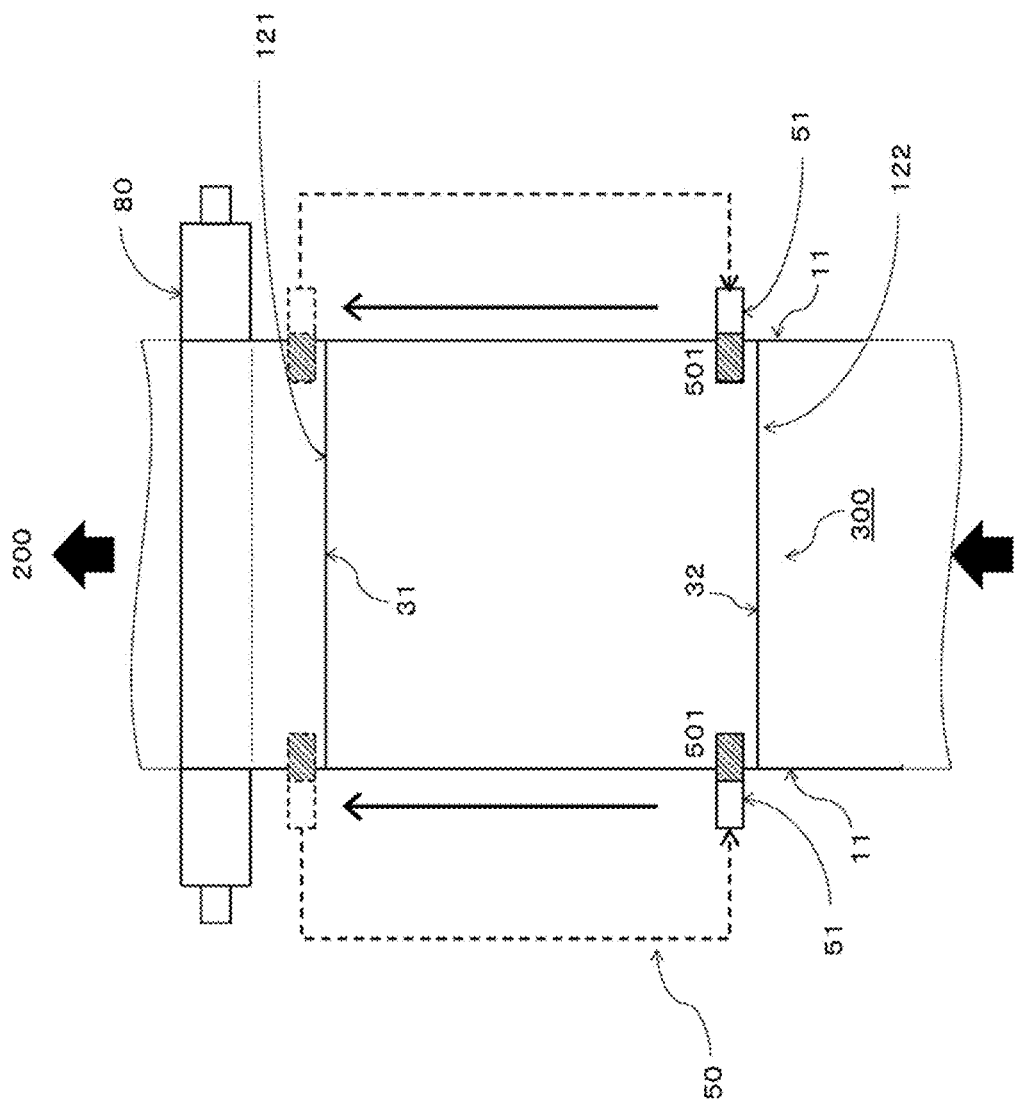
FIG. 4 is a schematic diagram illustrating an operation of the reciprocating holding device of the present invention.
Figure 5:
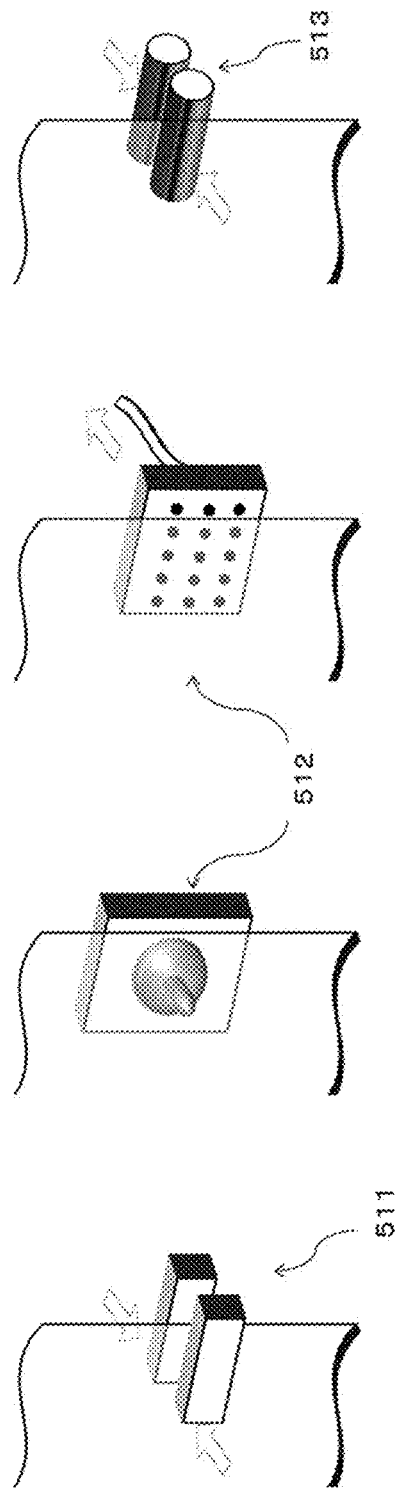
FIG. 5 shows schematic diagrams of holding means configuring the holding device of the present invention, respectively.

Step 2 is a step of holding and fixing the both sides 11 of the optical film laminate 1 by the holding means 51 of the holding device 50 at the upstream side predetermined position 300. As shown in FIG. 4 illustrating the operation of the reciprocating holding device, the holding position 501 of the optical film laminate 1 by the holding means 51 is preferably either of the rear end 32 of the preceding optical film sheet 3 to be laminated, or the front end 31 of the adjacent succeeding optical film sheet 3.

By the way, timing which the holding means 51 holds and fixes the optical film laminate 1 is preferably just after when the front end 31 of the optical film sheet 3 is pressed and fixed to the front end of the panel member 5 by the laminating means 210. It is because such timing allows the optical film sheet 3 which front end 31 is held and fixed to be held under tension at the upstream side, and thereby the deviation in the transverse direction and/or the flopping of the optical film sheet 3 is certainly suppressed.

Here, when the length of the optical film sheet 3 is short and the distance for the holding means 51 to move is not enough or when the holding means 51 cannot hold the rear end 32 of the film sheet 3 to be laminated because of apparatus design, the position of the holding position 501 (the upstream side predetermined position 300) of the optical film laminate 1 should be considered.

It is possible to determine the upstream side predetermined position 300 more upstream to the extent that a distance to allow for the holding means 51 to move is secured. However, as the upstream side predetermined position 300 gets far from the preceding optical film sheet 3 to be laminated, an effect of suppressing the deviation in the transverse direction and/or the flopping of the preceding optical film sheet 3 to be laminated lowers. Therefore, it is preferable to set the holding position 501 at the upstream side to the extent that the distance to allow for the holding means 51 to move is secured, and determine the holding position 501 at a position closer to the preceding optical film sheet 3 to be laminated.

Step 3 is a step to start an operation of laminating the peeled optical film sheet 3 with the panel member 5 via the adhesive layer 4 by the laminating means 210 at the laminating position 200. Step 3 further includes a step in which the carrier film 2 is wound by the distance corresponding to the length $L_0$ of the optical film sheet 3, and a step in which the holding means 51 moves while holding the both sides 11 of the optical film laminate 1, simultaneously.

Step 4 is a step in which the holding means 51 frees the both sides 11 of the optical film laminate 1 being held. In this step, the optical film laminate 1 held by the holding means 51 is released. This step is during the laminating operation of the optical film sheet 3 and the panel member 5, or just before such laminating operation.

Step 5 is a step in which the laminating means 210 is stopped and the laminating operation of the optical film sheet and the panel member 5 is completed. Step 5 further includes a step in which winding of R2 by the driving means 83 is stopped.

Step 6 is a step in which the holding means 51 which has released the optical film laminate 1 is returned to the upstream side predetermined position to prepare for the holding device 50 to hold and fix the adjacent succeeding optical film laminate 1.

FIG. 9 is a second operational flow in the manufacturing apparatus 10 having the reciprocating holding device 50 with the structure having wedge-shaped cross section 60 having the tip end 61. It is also Steps 1 to 6 of the second operational flow by the manufacturing apparatus 10 in which moving distance L of the holding device 50 becomes the length $L_0$ or less in the sending direction of the optical film sheet 3. Steps 1 to 6 of the second operational flow are described in the followings, focusing on differences with the first operational flow shown in FIG. 8.

Step 1 is a step of detecting the front end 31 (or the rear end 32) of the optical film sheet 3 by a sensor (FIG. 1), and detecting a position of the panel member 5 by another sensor 91 (FIG. 1) at the same time, and further, conveying the panel member 5 to the laminating position 200 to be aligned with the position of the optical film sheet 3 to adjust the position of the optical film sheet 3 and that of the panel member 5. Therefore, the laminating means 210 does not catch the optical film sheet 3 and the panel member 5 at the laminating position 200 as in the first operational flow of FIG. 8.

Step 2 is a step corresponding to Step 3 of the first operational flow in FIG. 8. It is a step to start an operation of laminating the optical film sheet 3 peeled from the carrier film 2 with the panel member 5 via the adhesive layer 4 by the laminating means 210 at the laminating position 200, but it comes before Step 2 of the first operational flow in FIG. 8. Specifically, the operation of the laminating means 210 starts before the step in which the holding means 51 holds and fixes the optical film laminate 1. Step 2 further includes a step in which the carrier film 2 is wound by the distance corresponding to the length $L_0$ of the optical film sheet 3.

Step 3 is a step in which, during the laminating operation of the optical film sheet 3 and the panel member 5 started in Step 2, at an initial position 300' where the holding means 51 of the holding device 50 starts operation, the holding means 51 holds and fixes the both sides 11 of the optical film laminate 1. The initial position 300' is a position corresponding to the upstream side predetermined position 300. Step 3 further includes a step in which, the holding means 51 is inter-related with the laminating operation for the optical film sheet 3 and the panel member 5, and moves by the predetermined distance L.

The timing when the holding means 51 holds and fixes the optical film laminate 1 is a state where the front end 31 of the optical film sheet 31 and the front end 55 of the panel member 5 are already caught by the laminating means 210. In Step 3 under such state, the both sides 11 of the optical film laminate 1 at the upstream side of the optical film sheet 3 is held and fixed by the holding means 51. The optical film laminate 1 succeeding the optical film sheet 3 caught by the laminating means 210 at the front end 31 is held and fixed by the holding means 51, and thus, the optical film sheet 3 is held under tension at the upstream side, and thereby the deviation in the transverse direction and/or the flopping of the optical film sheet 3 is certainly suppressed.

By the way, as shown in FIG. 4 illustrating the operation of the reciprocating holding device, the holding position 501 of the optical film laminate 1 by the holding means 51 is preferably either of the rear end 32 of the preceding optical film sheet 3 to be laminated, or the front end 31 of the adjacent optical film sheet 3.

Here, when the length of the optical film sheet 3 is short and the distance for the holding means 51 to move is not enough or when the holding means 51 cannot hold the rear end 32 of the film sheet 3 to be laminated because of the apparatus design, the position of the holding position 501 (the upstream side predetermined position 300) of the optical film laminate 1 should be considered. It is possible to determine the upstream side predetermined position at a more upstream side to the extent that a distance to allow for the holding means 51 to move is secured. However, as the upstream side predetermined position gets far from the preceding optical film sheet to be laminated, an effect of suppressing the deviation in the transverse direction and/or the flopping of the preceding optical film sheet to be laminated lowers. Therefore, it is preferable to set the holding position 501 at the upstream side to the extent that the distance to allow for the holding means 51 to move is secured, and determine the holding position 501 at a position closer to the preceding optical film sheet to be laminated.

Step 4 corresponds to Step 4 of the first operational flow in FIG. 8. It is a step in which, after the optical film laminate 1 is moved by the predetermined distance L while being held by the holding means 51, the optical film laminate 1 is released.

Step 5 is a step in which the laminating means 210 is stopped and the laminating operation of the optical film sheet and the panel member 5 is completed. Step 5 further includes a step in which winding of R2 by the driving means 83 is stopped.

Step 6 is a step in which the holding means 51 which has released the optical film laminate 1 is returned to the initial position (upstream side predetermined position 300). Step 6 further includes a step to prepare for the holding device 50 to hold and fix the adjacent succeeding optical film laminate 1.

FIG. 11 is a first operational flow in the manufacturing apparatus 10 having the reciprocating holding device 50 with the rotating drum 70 having the suctioning fixing part 71. It is also Steps of the first operational flow by the manufacturing apparatus 10 which moving distance L of the holding device 50 becomes the length $L_0$ in the sending direction of the optical film sheet 3. Steps 1 to 9 are described in detail in the followings.

Step 1 is a step in which the front end 31 (or rear end 32) of the optical film sheet 3 is detected by a sensor (not shown). However, different from the case where the structure having wedge-shaped cross section 60 is used as the peeling means 110, it is a feature of this manufacturing apparatus 10 that, in this step, a position of the suctioning fixing part 71 of the rotating drum 70 and a position of the front end 31 of the optical film sheet 3 reach a front end position of the peeling position 100.

Step 2 is a step in which a back side 30 of the front end 31 of the optical film sheet 3 is suctioned and fixed to the suctioning fixing part 71 of the rotating drum 70. At the same time or without delay, Step 3 is a step in which the both sides 11 of the optical film laminate 1 including the optical film sheet adjacent to the preceding optical film sheet 3 to be laminated is held and fixed by the holding means at the upstream predetermined position.

Step 4 is a step in which suctioning conveying of the optical film sheet 3 is started by the rotating drum 70. More in detail, the back side 30 of the front end 31 of the optical film sheet 3 has already been suctioned and fixed to the suctioning fixing part 71 of the rotating drum 70 in Step 2. Step 4 is a step in which, at the peeling position 100, the carrier film 2 of the optical film laminate 1 is wound in an inter-related manner with the winding operation of R2 by the driving means 83, and on the other hand, the rotating drum 70 is started from the position of the guide roller 80 to thereby peel the optical film sheet 3 with the adhesive layer 4 being suctioned and fixed to the suctioning fixing part 71 from the carrier film 2, and the optical film sheet 3, with the exposed adhesive layer 4, is suctioned and conveyed toward the downstream side predetermined position 400 by the rotation drum 70. A step in which the carrier film 2 is wound by the length $L_0$ of the optical film sheet 3, and a step in which the holding means 51 moves by the distance L while holding the both sides 11 of the optical film laminate 1 at the same time, are included.

Steps 5 and 6 are preferably performed at the same time. Step 5 is a step in which, when the downstream side predetermined position 400 is reached, the holding means 51 frees the optical film laminate 1 being held to thereby release the optical film laminate 1. At the same time, Step 6 is a step in which the suctioning conveying of the optical film sheet 3 by the rotating drum 70 is stopped. Step 6 further includes a step in which winding of the carrier film 2 to R2 by the driving means 83 is stopped.

Step 7 is a step in which the holding means 51 which has released the optical film laminate 1 is returned to the upstream side predetermined position 300. Step 7 further includes a step to prepare for the holding device 50 to hold the both sides 11 of the optical film laminate 1 adjacent to the preceding carrier film 3.

Step 8 is a step in which the position of the panel member 5 is detected by a sensor (not shown), and on the other side, the rotating drum 70 is activated again to restart the suctioning conveying of the optical film sheet 3, and at the laminating position 200, positions of the front end 31 of the optical film sheet 3 and the front end 55 of the panel member 5 are adjusted.

Step 9 is a step in which, at the laminating position 200, the optical film sheet 3 which has been suctioned and conveyed by the rotating drum 70 is laminated with the panel member 5 by one of the laminating rollers 201 of the laminating means 210 cooperating with the rotating drum 70.

FIG. 12 is a second operational flow in the manufacturing apparatus 10 having the reciprocating holding device 50 with the rotating drum 70 having the suctioning fixing part 71. It is also the second operational flow by the manufacturing apparatus 10 in which the moving distance L of the holding device 50 becomes the length $L_0$ or less in the sending direction of the optical film sheet 3. Steps 1 to 9 of the second operational flow are described in the followings, focusing on differences with the first operational flow shown in FIG. 11.

Steps 1 and 2 are the same steps as in the case of the first operational flow. Step 1 is a step in which the front end 31 (or rear end 32) of the optical film sheet 3 is detected by a sensor (not shown). It is the same in the case of the first operational flow in that, in this step, the position of the suctioning fixing part 71 of the rotating drum 70 and the position of the front end 31 of the optical film sheet 3 reach the front end position of the peeling position 100. Step 2 is a step in which the back side 30 of the front end 31 of the optical film sheet 3 is suctioned and fixed to the suctioning fixing part 71 of the rotating drum 70.

Step 3 is a step in which suctioning conveying of the optical film sheet 3 is started by the rotating drum 70. More in detail, here, the back side 30 of the front end 31 of the optical film sheet 3 has already been suctioned and fixed to the suctioning fixing part 71 of the rotating drum 70 in Step 2.

Step 3 is a step in which, at the peeling position 100, the carrier film 2 of the optical film laminate 1 is wound in an inter-related manner with the winding operation of R2 by the driving means 83, and on the other hand, the rotating drum 70 is started and rotated from the position of the guide roller 80 to thereby peel the optical film sheet 3 with the adhesive layer 4 being suctioned and fixed to the suctioning fixing part 71 from the carrier film 2, and the optical film sheet 3, with the exposed adhesive layer 4, is suctioned and conveyed to the downstream side predetermined position 400 by the rotation drum 70. Step 3 includes a step in which the carrier film 2 is wound by the distance $L_0$ of the optical film sheet 3.

Step 4 is a step in which the holding means 51 holds and fixes the both sides 11 of the optical film laminate 1 in which the optical film sheet 3 including the adhesive layer 4 peeled from the carrier film 2 is suctioned and conveyed by the rotating drum 70. At the same time, Step 4 includes a step in which the holding means 51 moves by the distance L while holding the both sides 11 of the optical film laminate 1.

Steps 5 and 6 are preferably performed at the same time, as in the case of the first operational flow. Step 5 is a step in which, when the downstream side predetermined position 400 is reached, the holding means 51 frees the optical film laminate 1 being held to thereby release the optical film laminate 1. At the same time, step 6 is a step in which the suctioning conveying of the optical film sheet 3 by the rotating drum 70 is stopped. Step 6 further includes a step in which winding of the carrier film 2 to R2 by the driving means 83 is stopped.

Step 7 corresponds to Step 7 of the first operational flow in FIG. 11. It is a step in which the holding means 51 which has released the optical film laminate 1 is returned to the initial position 300' (held and fixed position in Step 4). The initial position 300 is a position corresponding to the upstream side predetermined position 300 in FIGS. 10(a)-(f). Step 7 further includes a step to prepare for the holding device 50 to hold and fix the adjacent succeeding optical film laminate 1.

Step 8 and Step 9 respectively corresponds to Step 8 and Step 9 of the first operational flow. Step 8 is a step in which the position of the panel member 5 is detected by a sensor (not shown), and on the other side, the rotating drum 70 is activated again to restart the suctioning conveying of the optical film sheet 3, and at the laminating position 200, the front end 31 of the optical film sheet 3 and the position of the front end 55 of the panel member 5 are adjusted. Step 9 is a step in which, at the laminating position 200, the optical film sheet 3 which has been suctioned and conveyed by the rotating drum 70 is laminated with the panel member 5 by the laminating means 210' configured by the rotating drum 70 and the laminating roller 201 cooperating with the rotating drum 70.

The manufacturing method using the manufacturing apparatus 10 of the optical display unit 6 is typically shown in FIG. 2 and FIGS. 10(a) to (f) representing manufacturing processes. This is the manufacturing method using the manufacturing apparatus 10 deployed at the peeling position 100, in which the structure having wedge-shaped cross section 60 having the tip end 61 is deployed as the peeling means 110. The manufacturing method using the manufacturing apparatus 10 which deploys the rotating drum 70 having the suctioning fixing part 71 as the peeling means 110 deployed at the peeling position 100, shown in FIG. 3 and FIGS. 13(a) to (f) representing manufacturing processes, is contrasted thereto.

Figure 10:
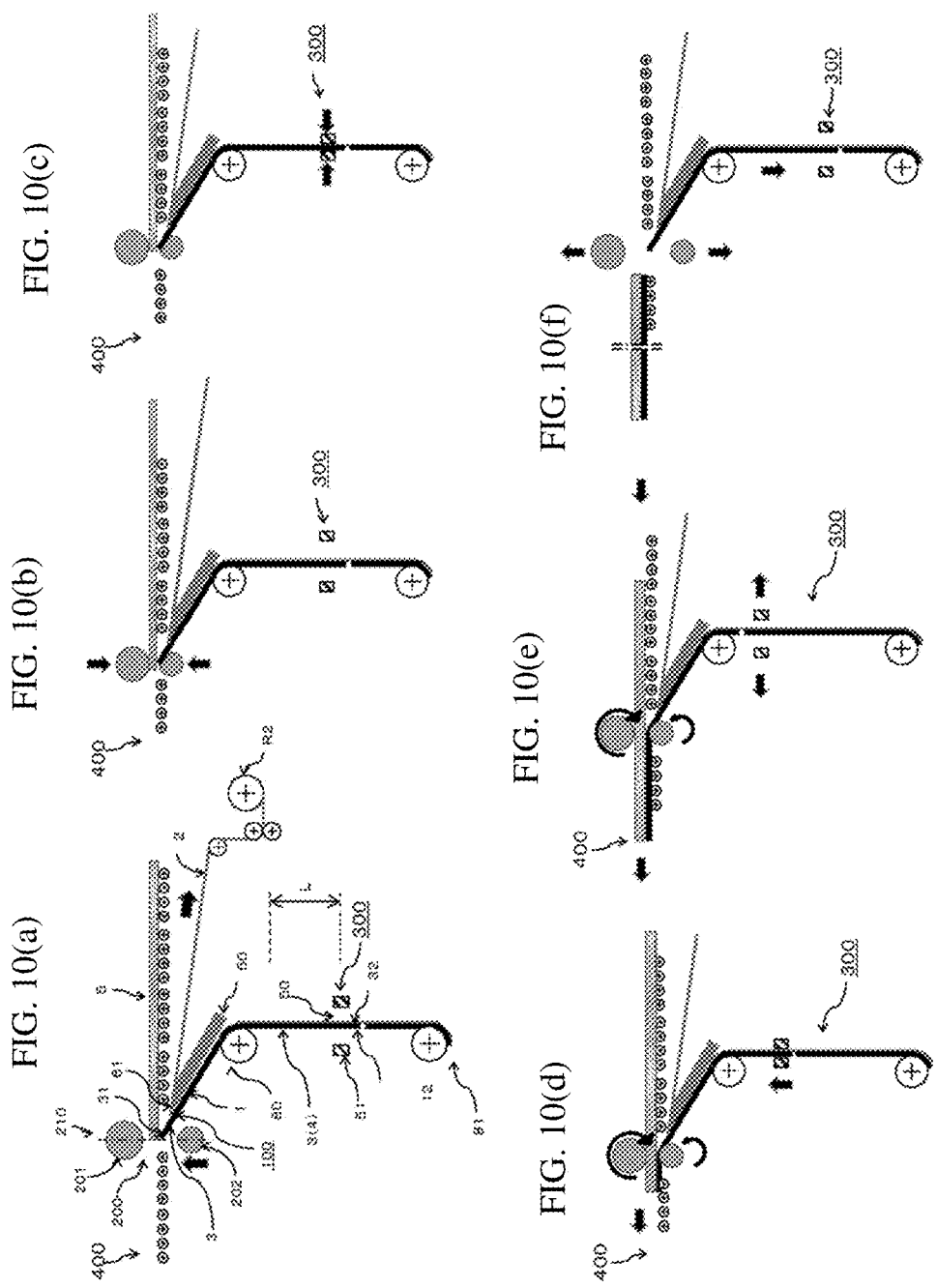
FIGS. 10(*a*)-(*f*) illustrate processes of a manufacturing method by the manufacturing apparatus of the present invention having the reciprocating holding device with the structure having wedge-shaped cross section having the tip end.

In the manufacturing process FIG. 10(a) of the manufacturing method shown in FIG. 2 using the manufacturing apparatus 10 in which the structure having wedge-shaped cross section 60 having the tip end 61 is deployed as the peeling means 110, the optical film laminate 1 is conveyed, and the optical film sheet 3 and the panel member 5 are ready to be laminated.

The manufacturing process FIG. 10(b) is a process in which, the laminating means 210 is activated to sandwich the front end 55 of the panel member 5 and the front end 31 of the optical film sheet 3.

The manufacturing process FIG. 10(c) is a process in which the holding device 50 is activated just after the process FIG. 10(b) to hold a width-wise direction including the both sides 11 of the optical film laminate 1 at the upstream side predetermined position 300.

The following manufacturing process FIG. 10(d) is a process in which the holding device 50 moves the fixed distance L in an inter-related manner with the laminating operation for the panel member 5 and the optical film sheet 3 while holding the optical film laminate 1.

Figure 6A:
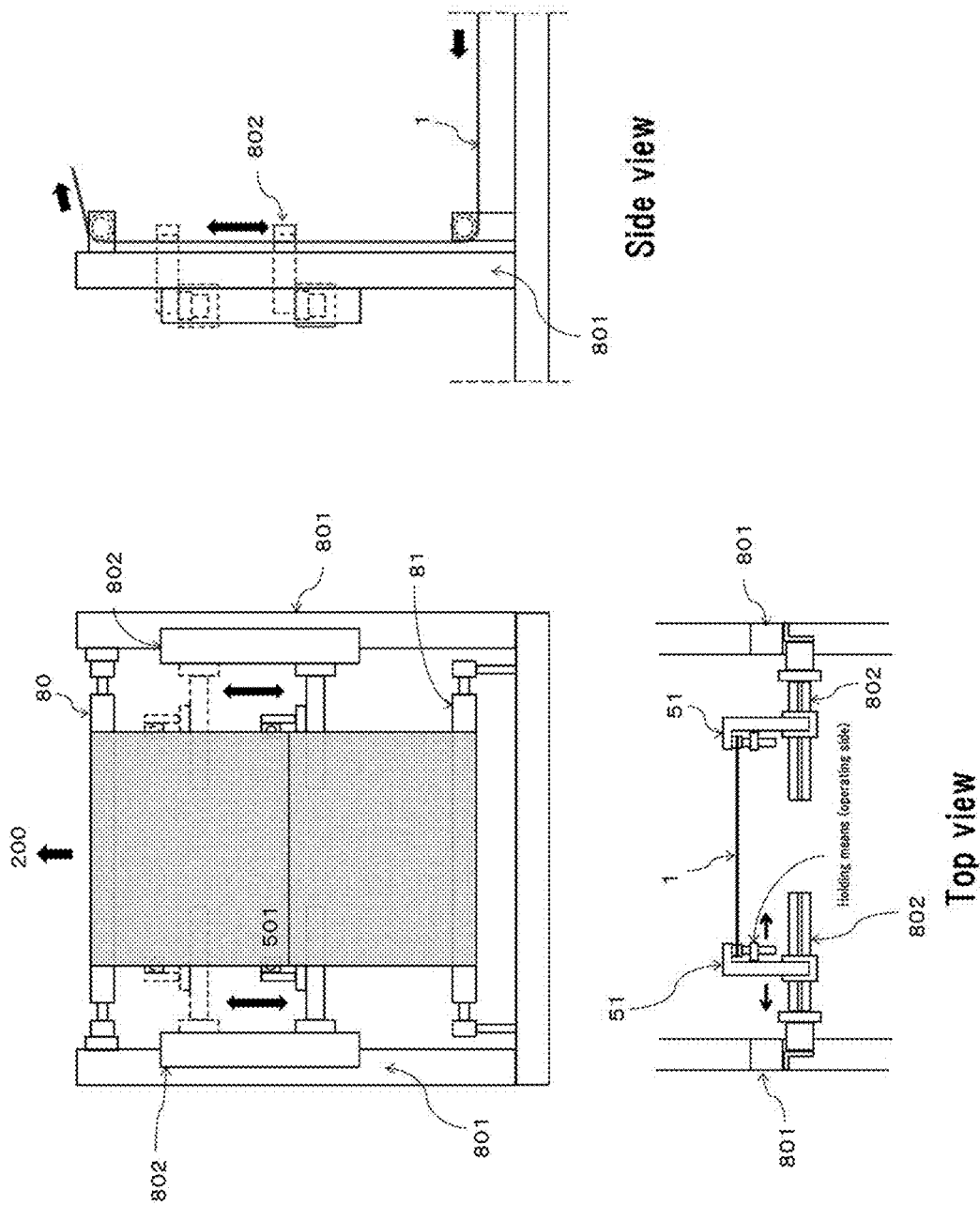
FIG. 6A shows a plan view, a side view, and a bottom view of the reciprocating holding device in which a holding position with respect to an optical film laminate of the present invention is a position near a rear end 32 of an optical film sheet 3.
Figure 6B:
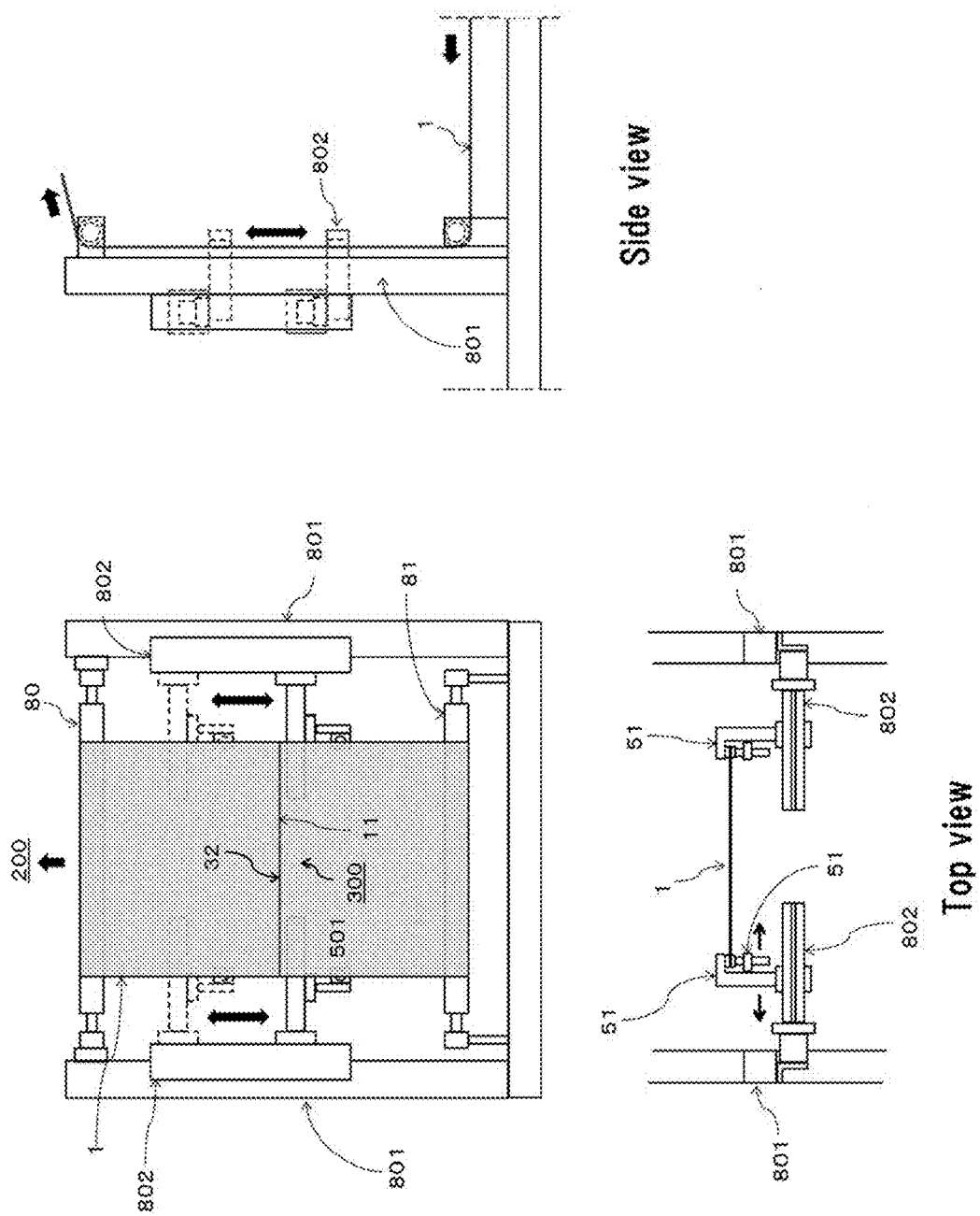
FIG. 6B shows a plan view, a side view, and a bottom view of the reciprocating holding device in which the holding position with respect to the optical film laminate of the present invention is a position near a front end 31 of an optical film sheet 3 succeeding the optical film sheet 3.
Figure 7:
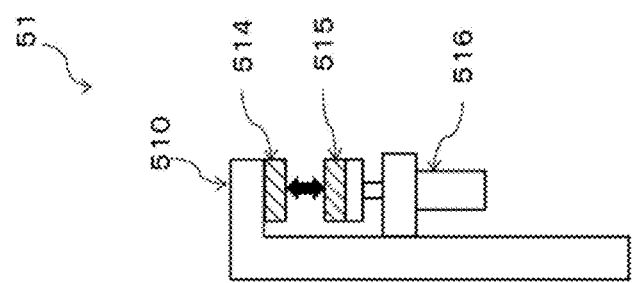
FIG. 7 is an aspect of the holding means of the present invention.

The holding device 50 may be either of FIG. 6A or FIG. 6B. In addition, an example of the holding means 51 is shown in FIG. 7. Incidentally, the top view of FIG. 6A or FIG. 6B shows that the both sides 11 of the optical film laminate 1 are held by a holding part 514 provided on a holding arm 510 and a holding part 515 provided on a cylinder 516 shown in FIG. 7.

The holding device 50 further consists of columns 801, 801 which configure L-shaped or T-shaped frame body supporting the guide roller 80 wider than the width of the optical film laminate 1 and the upstream side guide roller 81 from both sides, right and left guide rails 802, 802 equipped on the columns 801, 801, and the holding means 51, 51 holding the both sides 11, 11 of the optical film laminate 1 to the guide rails 802, 802.

In the holding device 50 shown in FIG. 6A, the holding position 501 of the optical film laminate 1 held by the holding means 51 is at a position near the rear end 32 of the optical film sheet 3 to be laminated with the panel member 5. In the holding device 50 shown in FIG. 6B, the holding position 501 of the optical film laminate 1 held by the holding means 51 is at a position near the front end 31 of the optical film sheet 3 succeeding the optical film sheet 3 to be laminated with the panel member 5.

The holding device 50 preferably moves outward in synchronization with the conveyance of the optical film laminate 1 being conveyed, or in synchronization with the winding operation for the carrier film 2. The distance L in which the optical film laminate 1 moves being held by the holding device 50 is considered as for a case where it is equal to the length $L_0$ of the sending direction of the optical film sheet 3, or a case where it is shorter than the length $L_0$ of the sending direction of the optical film sheet 3, depending on the size of the panel member 5 and/or the apparatus design.

In the laminating operation of the manufacturing process FIG. 10(d), while the optical film sheet 3 with the adhesive layer 4 is peeled from the carrier film 2 at the peeling position 100, the optical film sheet 3 is laminated with the panel member 5 via the adhesive layer 4 at the laminating position 200. This is characteristic in that it is the laminating operation succeeding the peeling operation.

The manufacturing process FIG. 10(e) is a process in which the holding means 51 releases the both sides 11 of the optical film laminate 1. In this process, the optical film laminate 1 held by the holding means 51 is freed. The process is performed during the laminating operation for the optical film sheet 3 and the panel member 5, or just before completion of the laminating operation.

The manufacturing process FIG. 10(f) is a process in which the laminating means 210 is stopped and the laminating operation for the optical film sheet and the panel member 5 is completed. This process further includes a process in which the winding of R2 by the driving means 83 is stopped, and a process in which the holding means 51 which has released the optical film laminate 1 is returned to the upstream side predetermined position 300 to prepare for holding and fixing the optical film laminate 1 succeeding the optical film 3.

Other manufacturing method using the manufacturing apparatus 10, in which the structure having wedge-shaped cross section 60 having the tip end 61 is deployed as the peeling means 110, is a process in which the manufacturing processes FIGS. 10(c) and (d) described in the above are replaced with the manufacturing processes (c') and (d') not shown in FIGS. 10(a)-(f).

Specifically, in the manufacturing process (c'), the laminating operation for the panel member 5 and the optical film sheet 3 is started. In the succeeding manufacturing process (d'), the holding device 50 holds and fixes the both sides 11 of the optical film laminate 1 being conveyed. The holding device 50 further moves the fixed distance L while holding the optical film laminate 1. The difference between them is that the former starts the laminating operation for the panel member 5 and the optical film sheet 3 after the optical film laminate 1 is held and fixed by the holding device 50, but in the latter, the optical film laminate 1 being conveyed is held and fixed after the laminating operation has started.

In either of manufacturing methods, the laminating means 210 is configured by the pair of laminating rollers 201 and 202 as shown in FIG. 2, and at the laminating position 200, the optical film sheet 3 is laminated with the panel member 5 via the adhesive layer 4 to continuously manufacture the optical display unit 6.

Figure 13A:
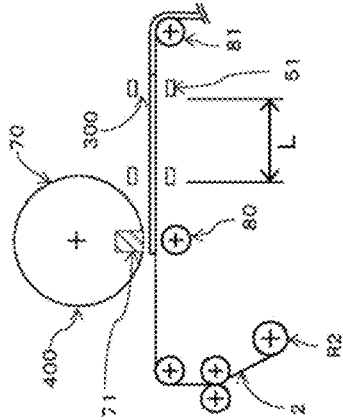
FIG. 13(*a*)-(*f*) illustrates processes of a manufacturing method by the manufacturing apparatus of the present invention having the reciprocating holding device with the rotating drum having the suctioning fixing part.
Figure 13B:
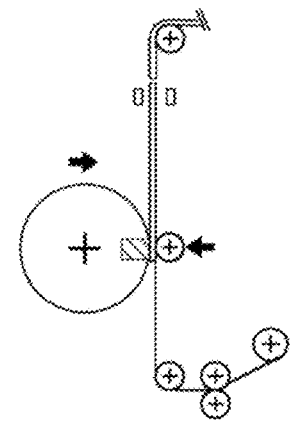

In the manufacturing process FIG. 13(a) of the present manufacturing method shown in FIG. 3 using the manufacturing apparatus 10 in which the rotating drum 70 having the suctioning fixing part 71 is deployed as the peeling means 110, the optical film laminate 1 is conveyed, and as shown in FIG. 13(a), the back side 30 of the front end 31 of the optical film sheet 3 is ready to be fixed to the suctioning fixing part 71 of the rotating drum 70. Therefore, the manufacturing process FIG. 13(b) may be a process in which the back side 30 of the front end 31 of the optical film sheet 3 caught by the guide roller 80 and the suctioning fixing part 71 of the rotating drum 70 is suctioned and fixed.

Figure 13C:
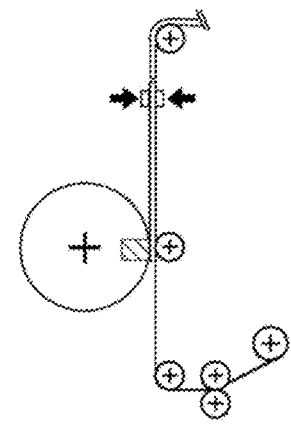

The manufacturing process FIG. 13(c) is a process in which the holding means 51 holds and fixes the both sides 11 of the optical film laminate 1 succeeding the optical film sheet 3. The manufacturing process FIG. 13(d) is a process in which the suctioning conveying of the rotating drum 70 is started at the same time with the process FIG. 13(d) or just after thereof.

Figure 13D:
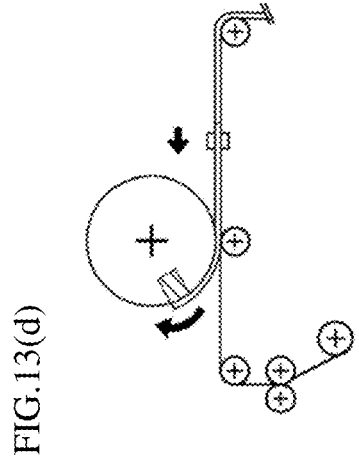

At the same time, the manufacturing process FIG. 13(d) further includes a process in which, at the peeling position 100, the carrier film 2 of the optical film laminate 1 is wound by the winding operation of R2 by the driving means 83 which is inter-related with the suctioning conveying of the optical film sheet 3, and on the other hand, rotating action of the rotating drum 70 is started from the position of the guide roller 80 to thereby peel the optical film sheet 3 from the carrier film 2, and the optical film sheet 3, with the exposed adhesive layer 4, is suctioned and conveyed to the downstream side predetermined position 400 by the rotation drum 70.

Figure 13E:
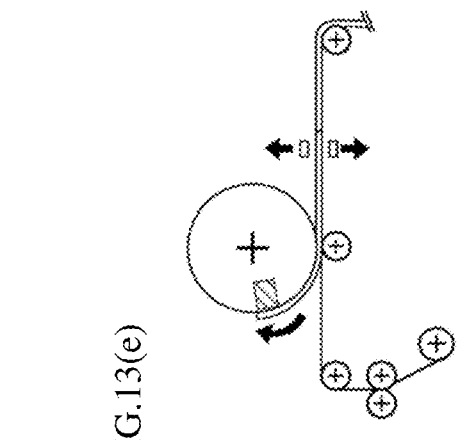

The manufacturing process FIG. 13(e) is a process in which, when the front end 31 of the optical film sheet 3 reaches the downstream side predetermined position 400, the holding means frees the optical film laminate 1 being held to thereby release the optical film laminate 1. At the same time, the manufacturing process FIG. 13(e) further includes a process in which the suctioning conveying of the optical film sheet 3 by the rotating drum 70 is stopped, and a process in which the winding of the carrier film 2 to R2 by the driving means is stopped by the stop of the driving means 83.

Figure 13F:
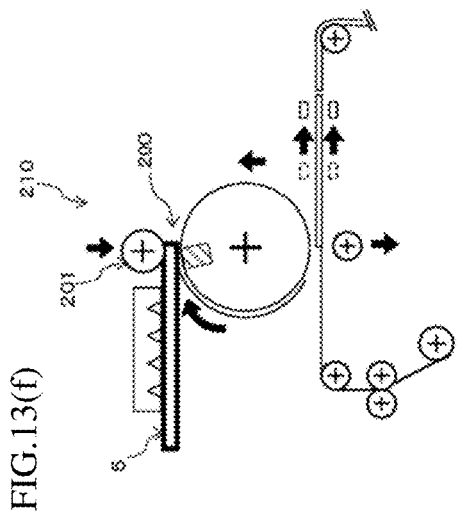

The manufacturing process FIG. 13(f) consists of a process in which the holding means 51 which has released the optical film laminate 1 is returned to the upstream side predetermined position 300 to prepare for the next holding operation; a process in which the position of the panel member 5 is detected by a sensor (not shown), the rotating drum 70 is activated again to restart the suctioning conveying of the optical film sheet 3, and at the laminating position 200, the front end 31 of the optical film sheet 3 and the position of the front end 55 of the panel member 5 are adjusted; and a process in which, at the laminating position 200, the optical film sheet 3 which has been suctioned and conveyed by the rotating drum 70 is laminated with the panel member 5 by the laminating means 210 configured by the rotating drum 70 and the laminating roller 201 cooperating with the rotating drum 70.

Other manufacturing method using the manufacturing apparatus 10, in which the rotating drum 70 having the suctioning fixing part 71 is deployed as the peeling means 110, is a process in which the manufacturing processes FIGS. 13(c) and (d) described in the above are replaced with the manufacturing processes (c') and (d') not shown in FIGS. 13(a)-(f).

Specifically, the manufacturing process (c') is a process in which the holding means 51 holds and fixes the both sides 11 of the optical film laminate 1 in which the optical film sheet 3 including the adhesive layer 4 peeled from the carrier film 2 is suctioned and conveyed by the rotating drum 70. The succeeding manufacturing process (d') is a process in which, at the same time, the holding means 51 moves the distance L while holding the both sides 11 of the optical film laminate 1. In the manufacturing process (d'), the front end 31 of the optical film sheet 3 peeled from the carrier film 2 is suctioned and conveyed by the rotating drum 70 to reach the downstream side predetermined position 400. The difference between them is that the former starts the rotation of the rotating drum 70 after the optical film laminate 1 is held and fixed by the holding device 50, but in the latter, the optical film laminate 1 being conveyed is held and fixed by the holding device 50 after the rotation of the rotating drum 70 has started.

In either of manufacturing methods, the laminating means 210 is configured by the pair of laminating rollers 201 and the rotating drum 70 as shown in FIG. 3, and at the laminating position 200, the optical film sheet 3 is laminated with the panel member 5 via the adhesive layer 4 to continuously manufacture the optical display unit 6.

[Operational Effect]

Figure 14:
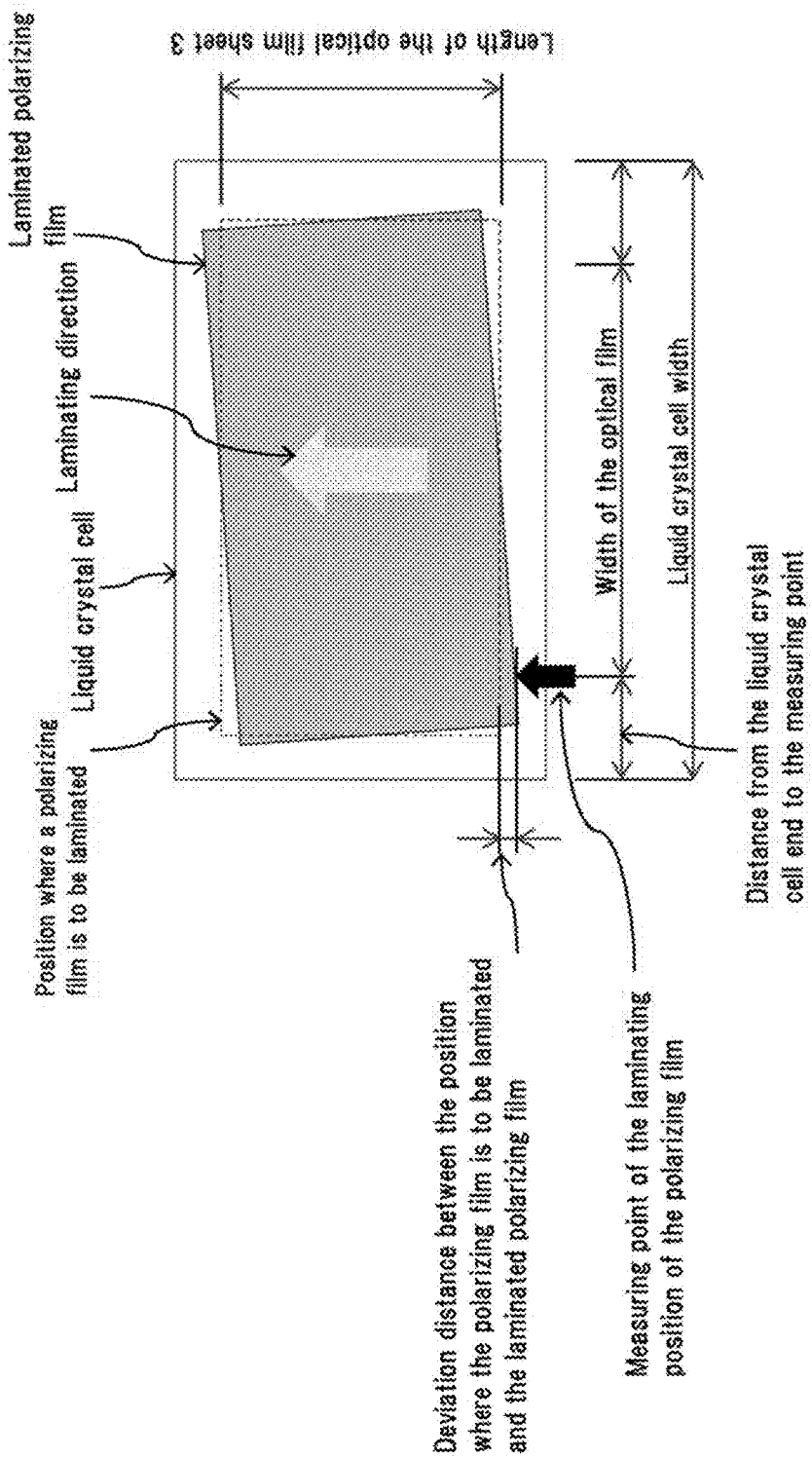
FIG. 14 is an illustration diagram of a measuring method of lamination accuracy of Example and Comparative Example.

FIG. 14 is an illustration diagram of a measuring method of lamination accuracy of Example and Comparative Example. A rectangular shown by a dashed line on a surface of the panel member 5 is a position where the optical film sheet 3 is to be laminated, and a rectangular shown by a solid line is a position where the optical film sheet 3 is actually laminated. The lamination accuracy required in the RTP manufacturing apparatus and manufacturing method of the present invention becomes close to a specific image when an accuracy which allows manufacturing of about five to six optical display units 6 per minute, from a size of the panel member 5 of about 1200 mm×750 mm and from a size of the optical film sheet of about 1000 mm×700 mm, is considered.

Figure 15:
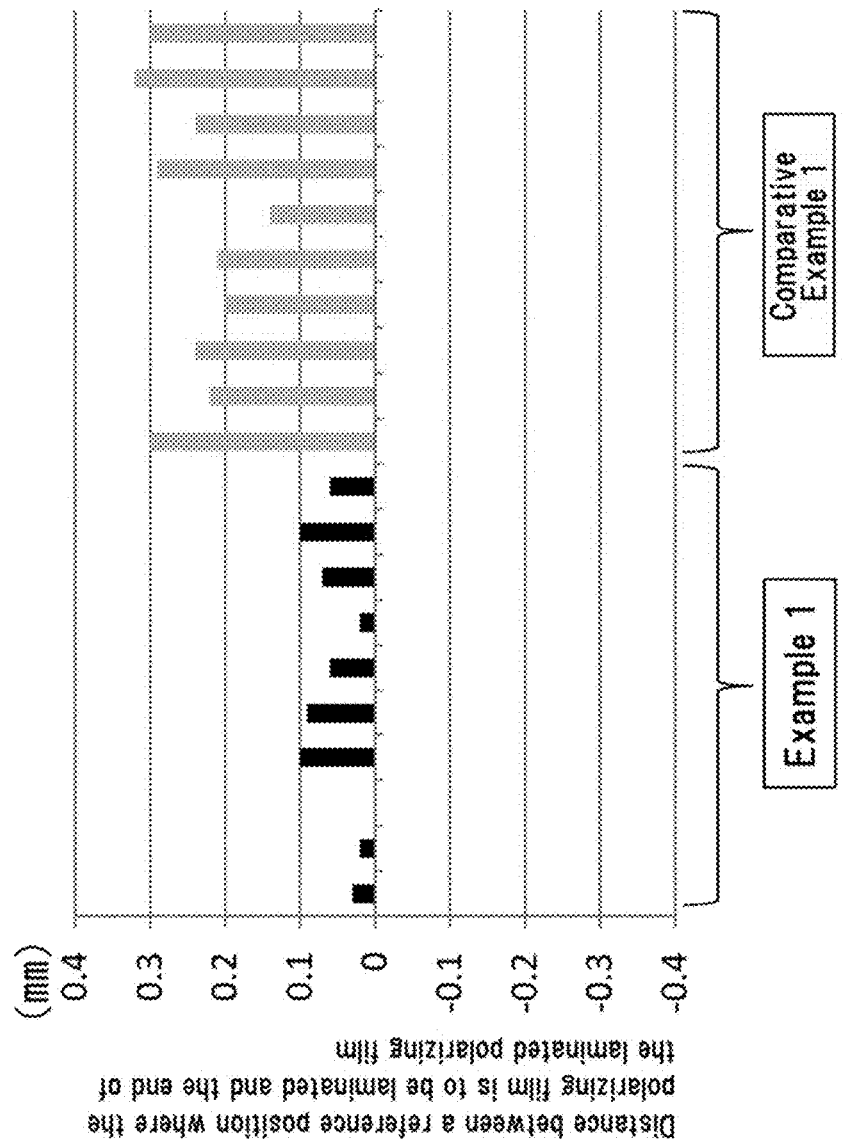
FIG. 15 shows actually measured data of Example and Comparative Example.

FIG. 15 is Example and Comparative Example of an RTP equipment using the structure having wedge-shaped cross section having the tip end 61 as the peeling means. FIG. 15 shows degrees of deviation between the position where the optical film sheet 3 is to be laminated (dashed line) and the position actually laminated (solid line) in Example 1 and Comparative Example 1. The optical film sheet 3 used in Example 1 and Comparative Example 1 was a polarizing film manufactured by Nitto Denko Corporation (Type: SEG1423DU), and a panel member taken out from a liquid crystal television manufactured by SHARP (Type: AQUOS LC-55W30) was used for the panel member 5. A deviation distance was determined by manually measuring a distance from the rear end in the conveying direction of the panel member to the rear end of the optical film sheet 3 also in the conveying direction, and based thereon, the deviation distance from the position to be laminated was calculated.

In Example 1, a mechanism is used, which moves the both sides 11 of the optical film laminate 1 by the fixed distance L while holding thereof by the holding means 51 of the holding device 50 at the upstream side predetermined position 300, and when the front end 31 of the optical film sheet 3 reaches the downstream side predetermined position 400, releases the holding means 51 to measure the deviation distance with the position where the optical film sheet 3 is to be laminated in the optical display unit in which the panel member 5 and the optical film sheet 3 are laminated. By the way, the moving distance L of the holding device 50 is set as 100 mm.

Comparative Example 1 is an example with the same manufacturing apparatus which moves the both sides 11 of the optical film laminate 1 by the fixed distance L while holding thereof by the holding device 50, without using the holding process of the holding device 50.

It is apparent from FIG. 15 that the deviation distance for the optical film sheet of a size of about 1000 mm×700 mm is within a range of 0-0.1 mm in 10 measurements, and no deviation exceeding 0.1 mm has generated in Example 1 using the present invention. In contrast, in Comparative Example 1 with the manufacturing apparatus which does not use the holding process of the holding device 50, the deviation is 0.1 mm or more in all 10 measurements. In addition, the measurement value of 0.2 mm or less came out only once. It shows the result that, as can be seen in the measurement value exceeding 0.3 mm, the deviation distance is 0.2 mm or more in most measurements, and the value varies around 0.3 mm.

It is apparent from these data that the lamination accuracy realized in the RTP manufacturing apparatus and manufacturing method of the present invention is extremely high which may not be possibly achieved by prior art.

In the RTP manufacturing apparatus and manufacturing method, the optical film sheet 3 formed on the carrier film 2 of the long web of optical film laminate 1 fed from R1 is difficult to be moved right and left due to the long web shape, and thus, difficult to be aligned with the panel member 5 with accuracy. Therefore, as shown in Patent Literature 4, there were no choice but to align the panel member 5 to the optical film sheet 3, and a technique for detecting the position of the optical film sheet 3 with high accuracy and aligning the position of the panel member to the detected position of the optical film sheet 3 with high accuracy has been developed so far. However, along with growth in size and narrow width bezels etc. of the display in recent years, even if the alignment at the beginning of the lamination is done with high accuracy, it is difficult to maintain the high lamination accuracy until the lamination is completed due to deviation and/or flopping of the film during the lamination.

The RTP manufacturing apparatus and manufacturing method of the present invention incorporating the process of moving the both sides 11 of the optical film laminate 1 by the fixed distance L while holding thereof by the holding device 50 allows for extremely high lamination accuracy which may not be possibly achieved by prior art, and sufficiently satisfies the requirement of the narrow width bezels of recent years.

While the present invention has been described by provisionally limited examples and figures in the above, it is not limited thereto, and it is needless to say that various modification and alteration are possible within an equivalent scope of the technical idea of the present invention and claims described in the followings by those having ordinary skill in the art in the technical field which the present invention belongs to.

REFERENCE SIGNS LIST

R1: Feeding device
R2: Winding device
R3: Slitting device
1: Optical film laminate
2: Carrier film
20: Back side of carrier film
3: Optical film sheet
30: Back side of optical film sheet
31: Front end of optical film sheet
32: Rear end of optical film sheet
4: Adhesive layer
5: Panel member
55: Front end of panel member
6: Optical display unit
10: Manufacturing apparatus
12: Slit lines
50: Holding device
60: Structure having wedge-shaped cross section
61: Tip end
70: Rotating drum
71: Suctioning fixing part
80: Guide rollers
81: Upstream side guide roller
82: Driving means
83: Driving means
90: Sensor for detecting front end position of optical laminate or that of optical film sheet
91: Panel position detecting sensor
100: Peeling position
110: Peeling means
200: Laminating position
210: Laminating means
201: Laminating roller
202: Laminating roller
300: Upstream side predetermined position
400: Downstream side predetermined position
501: Holding position
510: Holding arm
511: Pair of catching means
512: Sucking cup or sucking means
513: Pair of sandwiching rollers
514: Holding part
515: Holding part
516: Cylinder
801: Column
802: Guide rail

The invention claimed is:

1. A manufacturing apparatus for continuously manufacturing an optical display unit by conveying a web of optical film laminate including a carrier film, an adhesive layer formed on one of opposite surfaces of the carrier film, and a plurality of optical film sheets continuously supported on the carrier film via the adhesive layer, and at a peeling position, sequentially peeling the optical film sheet with the adhesive layer from the carrier film, and at a laminating position, laminating the optical film sheet with a panel member, wherein
in the manufacturing apparatus, a holding device is deployed between the peeling position and an upstream side predetermined position, wherein the holding device reciprocates in a conveying direction of the optical film laminate,
the holding device is configured to, at the upstream side predetermined position, hold the optical film laminate in a width-wise direction including both sides, and move the optical film laminate being held for a fixed distance, and
the holding device is configured to, at the peeling position, release the optical film laminate when a front end of the optical film sheet peeled with the adhesive layer from the carrier film reaches a downstream side predetermined position.

2. The manufacturing apparatus according to claim 1, wherein the holding device moves in the conveying direction in synchronization with a conveyance of the optical film laminate.

3. The manufacturing apparatus according to claim 1, further comprises a structure having wedge-shaped cross section having a tip end deployed at the peeling position, wherein the structure having wedge-shaped cross section is configured to, while conveying the optical film laminate, bend a back side of the carrier film at the tip end to wind thereof to thereby peel the optical film sheet with the adhesive layer from the carrier film so that the front end of the peeled optical film sheet reaches the downstream side predetermined position.

4. The manufacturing apparatus according to claim 3, wherein the downstream side predetermined position is downstream of the laminating position.

5. The manufacturing apparatus according to claim 1, further comprises a rotating drum having a suctioning fixing part deployed at the peeling position, wherein the rotating drum is configured to, while conveying the optical film laminate, suction and fix a back side of the optical film sheet to the rotating drum, and wind the optical film sheet with the adhesive layer to the rotating drum while peeling thereof from the carrier film to thereby suction and convey the front end of the optical film sheet with the adhesive layer to the downstream side predetermined position.

6. The manufacturing apparatus according to claim 1, wherein the manufacturing apparatus is configured to
forming the optical film laminate by placing the optical film sheet including the adhesive layer shaped at least rectangularly to be adhered on the carrier film, or
forming the optical film laminate by forming slit lines in a width-wise direction at fixed longitudinal intervals in an optical film in which the carrier film is laminated via an adhesive layer to form an optical film sheet including the adhesive layer.

7. The manufacturing apparatus according to claim 1, wherein a holding position of the holding device with respect to the optical film laminate is a position near a rear end of the optical film sheet just before being sent to the laminating position.

8. The manufacturing apparatus according to claim 1, wherein a holding position of the holding device with respect to the optical film laminate is a position near a front end of an optical film sheet succeeding the optical film sheet just before being sent to the laminating position.

9. The manufacturing apparatus according to claim 1, wherein the holding device is inter-related with the conveyance of the optical film laminate to correct loosening of tension at both sides of the optical film laminate or difference in tension due to the loosening to thereby suppress deviation in a transverse direction and/or flopping of the optical film sheet including the adhesive layer peeled from the carrier film to be sent to the downstream side predetermined position.

10. A manufacturing method for continuously manufacturing an optical display unit by, in a manufacturing apparatus of an optical display unit, conveying a web of optical film laminate including a carrier film, an adhesive layer formed on one of opposite surfaces of the carrier film, and a plurality of optical film sheets continuously supported on the carrier film via the adhesive layer, and at a peeling position, sequentially peeling the optical film sheet with the adhesive layer from the carrier film, and at a laminating position, laminating the optical film sheet with a panel member, wherein in the manufacturing apparatus, a holding device is deployed between the peeling position and an upstream side predetermined position of the peeling position, wherein the holding device reciprocates in a conveying direction of the optical film laminate, the method comprises:

a holding process in which the holding device holds the optical film laminate in a width-wise direction including both sides when the optical film laminate reaches the upstream side predetermined position, an outwardly moving process in which the optical film laminate moves in the conveying direction for a fixed distance while being held by the holding device, a peeling process in which the optical film sheet is peeled with the adhesive layer from the carrier film at the peeling position, a backwardly moving process in which, when a front end of the optical film sheet reaches a downstream side predetermined position of the peeling position, the holding device releases the optical film laminate and returns to the upstream side predetermined position, and a laminating process in which the peeled optical film sheet is laminated with the panel member by the adhesive layer at the laminating position.

11. The manufacturing method according to claim 10, wherein the holding device moves outwardly in synchronization with a conveyance of the optical film laminate.

12. The manufacturing method according to claim 10, wherein in the manufacturing apparatus, a structure having wedge-shaped cross section having a tip end is deployed at the peeling position, and in the peeling process, while the optical film laminate is conveyed, at the peeling position, a back side of the carrier film is bent at the tip end of the structure having wedge-shaped cross section for winding thereof to thereby peel the optical film sheet with the adhesive layer from the carrier film.

13. The manufacturing method according to claim 12, wherein the downstream side predetermined position is downstream of the laminating position.

14. The manufacturing method according to claim 10, wherein in the manufacturing apparatus, a rotating drum having a suctioning fixing part is deployed at the peeling position, and in the peeling process, while the optical film laminate is conveyed, at the peeling position, a back side of the optical film sheet is suctioned and fixed to the rotating drum, and the optical film sheet is wound with the adhesive layer to the rotating drum from the carrier film to thereby peel the optical film sheet with the adhesive layer from the carrier film.

15. The manufacturing method according to claim 10, wherein the optical film laminate is either of an optical film laminate made by placing the optical film sheet including the adhesive layer shaped at least rectangularly to be adhered on the carrier film, or an optical film laminate made by forming slit lines in a width-wise direction at fixed longitudinal intervals in an optical film in which the carrier film is laminated via an adhesive layer to form an optical film sheet including the adhesive layer.

16. The manufacturing method according to claim 10, wherein a holding position of the holding device with respect to the optical film laminate is a position near a rear end of the last optical film sheet.

17. The manufacturing method according to claim 10, wherein a holding position of the holding device with respect to the optical film laminate is a position near a front end of an optical film sheet succeeding the optical film sheet just before being sent to the laminating position.

18. The manufacturing method according to claim 10, wherein the outwardly moving process is inter-related with the conveyance of the optical film laminate, and loosening of tension at both sides of the optical film laminate or difference in tension due to the loosening is corrected to thereby suppress deviation in a transverse direction and/or flopping of the optical film sheet including the adhesive layer peeled from the carrier film to be sent to the downstream side predetermined position.

* * * * *